US006784322B2

(12) United States Patent
Koch

(10) Patent No.: US 6,784,322 B2
(45) Date of Patent: Aug. 31, 2004

(54) OLIGOMERIC AND POLYMERIC OLED MATERIALS PRODUCED VIA ARYLATION OF QUINONES

(75) Inventor: Gene Koch, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/833,201

(22) Filed: Apr. 10, 2001

(65) Prior Publication Data

US 2002/0037428 A1 Mar. 28, 2002

Related U.S. Application Data

(60) Provisional application No. 60/195,902, filed on Apr. 10, 2000.

(51) Int. Cl.$^7$ .................. C07C 323/18; C07C 43/20; C07C 211/44
(52) U.S. Cl. .................. 568/58; 568/642; 564/305
(58) Field of Search .................. 568/642, 58; 564/305

(56) References Cited

U.S. PATENT DOCUMENTS

| | | | |
|---|---|---|---|
| 4,288,147 A | 9/1981 | Koch | 350/349 |
| 4,814,403 A | 3/1989 | Dussart-Lermusiaux et al. | 526/265 |
| 5,585,454 A | 12/1996 | Yamamoto | 528/220 |
| 5,597,890 A | 1/1997 | Jene Khe | 528/397 |
| 5,646,232 A | 7/1997 | Marrocco et al. | 528/126 |
| 5,712,361 A | 1/1998 | Stern et al. | 528/86 |
| 5,728,480 A | 3/1998 | Stern et al. | 428/690 |
| 5,747,182 A | 5/1998 | Friend et al. | 428/690 |
| 5,856,434 A | 1/1999 | Stern et al. | 528/402 |
| 5,874,179 A | 2/1999 | Kreuder et al. | 428/690 |
| 6,040,069 A | 3/2000 | Lupo et al. | 428/690 |
| 6,114,490 A | 9/2000 | Kreuder et al. | 528/86 |
| 6,117,529 A | 9/2000 | Leising et al. | 428/209 |

FOREIGN PATENT DOCUMENTS

| | | | |
|---|---|---|---|
| EP | 0 130 056 A | 1/1985 | C08G/61/10 |
| GB | 1100261 | * 1/1968 | |

OTHER PUBLICATIONS

Florin et al. "High–temperature liquids." U.S. Atomic Energy Comm., BNL–2446, p. 89–102, 1955 (Abstract attached).*

Kovyrzina et al., "Synthesis of alkylated p–polyphenylenes. II. Methyl and hexyl substituted derivatives." Zhurnal Organicheskoi Khimii, vol. 13(11), pp. 2395–2398, 1977 (Abstract attached).*

Yamamoto T et al., "Preparation of PI–Conjugated Poly-(Hydroquinone–2,5–Diyl) and Poly(P–benzoquinone–2, 5–Diyl) and Their Electrochemical Behavior", Macromolecules, American Chemical Society, Apr. 21, 1998, Easton US.

Tour J.M., "Soluble Oligo– and Polyphenylenes", Advanced Materials, VCH, Mar. 1, 1994, Verlagsgesellschaft, Weinheim, DE.

* cited by examiner

Primary Examiner—Barbara P. Badio

(57) ABSTRACT

OLED materials are provided that have the general formula:

$$R^1-(Ar^i)_n-R^2$$

wherein the subscript n is an integer of from 5 to 15; the superscript i is an integer of from 1 to n and denotes the position downstream from $R^1$; each $Ar^i$ is a substituted or unsubstituted aryl group; $R^1$ and $R^2$ are each substituents that increase the solubility of the para-phenylene compound in nonpolar organic solvents relative to the solubility of the corresponding compound wherein $R^1$ and $R^2$ are hydrogen; with the proviso that the $Ar^i$ groups are linked together in a 1,4-paraphenylene manner.

1 Claim, 16 Drawing Sheets

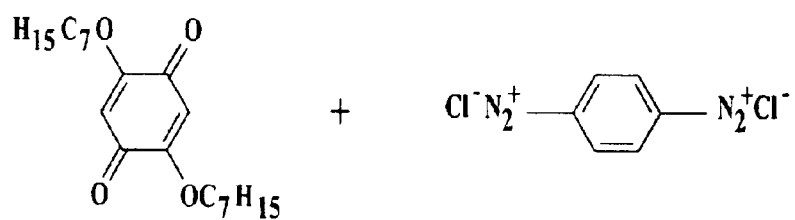
*Fig. 8A.*
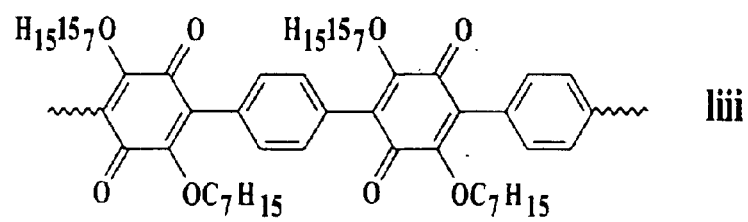
*Fig. 8B.*
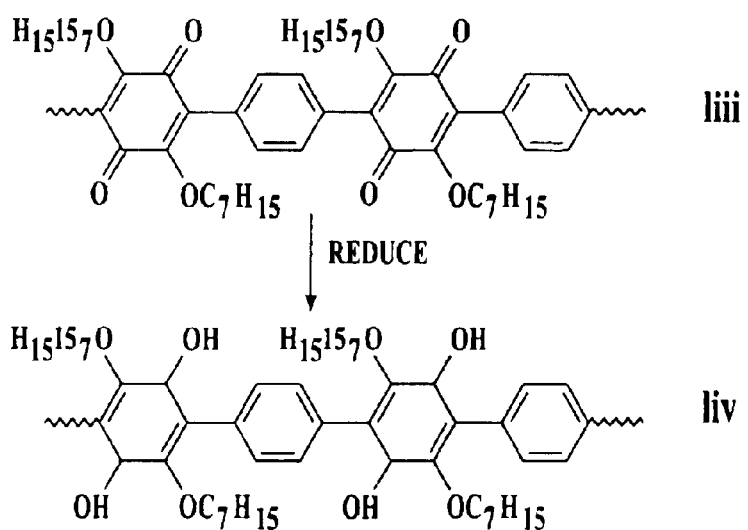

OLIGOMERIC AND POLYMERIC OLED MATERIALS PRODUCED VIA ARYLATION OF QUINONES

CROSS-REFERENCES TO RELATED APPLICATIONS

This application claims the benefit of provisional U.S. application Serial No. 60/195,902, filed Apr. 10, 2000, the disclosure of which is incorporated herein by reference.

STATEMENT AS TO RIGHTS TO INVENTIONS MADE UNDER FEDERALLY SPONSORED RESEARCH AND DEVELOPMENT

Not applicable

BACKGROUND OF THE INVENTION

Organic light emitting devices (OLEDs) are comprised of several thin layers of organic materials. These layers can be made to electroluminesce by applying a voltage across the device, and with sufficient brightness, range of color and operating lifetimes can be a practical alternative to LCD-based full color flat-panel displays. By placing red (R), green (G), and blue (B) emitting organic materials in a vertically stacked geometry with other transparent thin organic films, a new OLED display pixel is achieved which can be fabricated simply and provide a cost effective display panel.

In general, these OLED devices rely on a common mechanism leading to optical emission. Typically, this mechanism is based upon the radiative recombination of a trapped charge. Specifically, OLEDs will contain at least two thin organic layers separating the anode and cathode of the device. The material of one of these layers is specifically chosen based on the material's ability to transport holes, a "hole transporting layer" (HTL), and the material of the other layer is specifically selected according to its ability to transport electrons, an "electron transporting layer" (ETL). With such a construction, the device can be viewed as a diode with a forward bias when the potential applied to the anode is higher than the potential applied to the cathode. Under these bias conditions, the anode injects holes (positive charge carriers) into the hole transporting layer, while the cathode injects electrons into the electron transporting layer. The portion of the luminescent medium adjacent to the anode thus forms a hole injecting and transporting zone while the portion of the luminescent medium adjacent to the cathode forms an electron injecting and transporting zone. The injected holes and electrons each migrate toward the oppositely charged electrode. When an electron and hole localize on the same molecule, a Frenkel exciton is formed. Recombination of this short-lived state may be visualized as an electron dropping from its conduction potential to a valence band, with relaxation occurring, under certain conditions, preferentially via a photoemissive mechanism. Under this view of the mechanism of operation of typical thin-layer organic devices, the electroluminescent layer comprises a luminescence zone receiving mobile charge carriers (electrons and holes) from each electrode.

The materials that function as the electron transporting layer of the OLED are frequently the same materials that are incorporated into the OLED to produce the electroluminescent emission. Such devices in which the electron transporting layer functions as the emissive layer are referred to as having a single heterostructure. Alternatively, the electroluminescent material may be present in a separate emissive layer between the hole transporting layer and the electron transporting layer in what is referred to as a double heterostructure.

In addition to emissive materials that are present as the predominant component in the electron transporting layer, and that function both as the electron transporting material as well as the emissive material, the emissive material may itself be present in relatively low concentrations as a dopant in the electron transporting layer. Whenever a dopant is present, the predominant material in the electron transporting layer may be referred to as a host material. Materials that are present as host and dopant are selected so as to have a high level of energy transfer from the host to the dopant material. In addition, these materials need to be capable of producing acceptable electrical properties for the OLED. Furthermore, such host and dopant materials are preferably capable of being incorporated into the OLED using starting materials that can be readily incorporated into the OLED by using convenient fabrication techniques, in particular, by using vacuum-deposition techniques.

It is desirable for OLEDs to be fabricated using materials that provide electroluminescent emission in a relatively narrow band centered near selected spectral regions, which correspond to one of the three primary colors, red, green and blue so that they may be used as a colored layer in an OLED or stacked OLED. Additionally, the compounds should come from a class of compounds in which the emission may be varied by selectively varying the substituents or by modifying the structure of a base compound that produces emission from a charge transfer transition. Still further, the compounds should be capable of being readily deposited as a thin layer using vapor-phase or vacuum deposition techniques so that the compound can be readily incorporated into an OLED that is prepared entirely from, for example, vacuum-deposited organic materials. Still other considerations for new OEL materials involves considerations of environmental stability, cycle life and ease of fabrication. In order to ensure environmental stability and long cycle life, the organic phosphors should be as inert to unwanted chemical and electrochemical reactions as possible.

A candidate structure in terms of stability would be polyparaphenylene (PPP), a polymer composed of a sequence of linearly connected benzene rings. PPP has excellent stability and luminescence properties, but is neither soluble in organic solvents nor volatile. As a result, PPP cannot be deposited as a thin film on a substrate surface to allow fabrication of a useful display device.

What is needed in the art are new polyparaphenylene materials that have suitable solubility and or deposition properties and further have the desired luminescence properties. Surprisingly, the present invention provides such compounds.

SUMMARY OF THE INVENTION

In one aspect, the present invention provides an oligomeric para-phenylene compound having the formula:

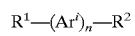

$$R^1\text{—}(Ar^i)_n\text{—}R^2$$

wherein the subscript n is an integer of from 5 to 15; the superscript i is an integer of from 1 to n and denotes the position downstream from $R^1$; each $Ar^i$ is a substituted or unsubstituted aryl group; $R^1$ and $R^2$ are each substituents that increase the solubility of the para-phenylene compound in nonpolar organic solvents relative to the solubility of the corresponding compound wherein $R^1$ and $R^2$ are hydrogen; with the proviso that the $Ar^i$ groups are linked together in a 1,4-paraphenylene manner.

Preferably the substituents $R^1$ and $R^2$ each independently have the formula:

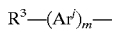

wherein the subscript m is an integer of from 1 to 5; the superscript j is an integer of from 1 to m and denotes the position of each $Ar^j$ away from $R^3$. Each $Ar_j$ is selected from:

a) a 1,4-phenylene group having the formula:

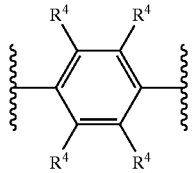

wherein each $R^4$ is independently selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted $di(C_1-C_{12})$alkylamino, substituted or unsubstituted arylamino, substituted or unsubstituted diarylamino and halogen, with the proviso that at least two of the four $R^4$ substituents are independently selected from substituted or unsubstituted $(C_1-C_{12})$alkyl and substituted or unsubstituted $(C_1-C_{12})$alkoxy, and b) an aryl biradical selected from 1,4-naphthylene, 1,4-anthrylene, 9,10-anthrylene, 5,6,7,8-tetrahydronaphth-1,4-ylene, 9,9',10,10'-tetra($C_1-C_{12}$)alkyl-9,10-dihydroanthr-1,4-ylene, 9,9'10,10'-tetraaryl-9,10-dihydroanthr-1,4-ylene, 9,9'10,10'-tetra($C_1-C_{12}$)alkyl-9,10-dihydroanthr-2,6-ylene, and 9,9'10,10'-tetraaryl-9,10-dihydroanthr-1,4-ylene; and $R^3$ is selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted $di(C_1-C_{12})$alkylamino, substituted or unsubstituted arylamino, substituted or unsubstituted diarylamino and halogen.

In another aspect, the present invention provides a polymer of the formula:

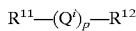

wherein each $R^{11}$ and $R^{12}$ is independently selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted $di(C_1-C_{12})$alkylamino, substituted or unsubstituted arylamino, substituted or unsubstituted diarylamino and halogen; the subscript p is an integer of from 5 to 200; the superscript i is an integer of from 1 to p and indicates the position downstream from $R^1$ of each Q; each $Q^i$ is a benzoquinone or hydroquinone subunit selected from the formulae:

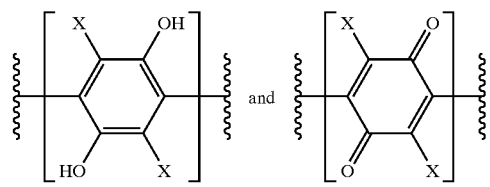

wherein each X is independently selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted $di(C_1-C_{12})$alkylamino, substituted or unsubstituted arylamino, substituted or unsubstituted diarylamino and halogen.

In one group of embodiments, the hydroquinone and benzoquinone subunits are present in about a 50:50 ratio. In another group of embodiments, the hydroquinone and benzoquinone subunits alternate in the polymer so that no two hydroquinone subunits are adjacent and no two benzoquinone subunits are adjacent. In yet another group of embodiments, two adjacent hydroquinone subunits alternate with one benzoquinone subunit. In still another group of embodiments, two adjacent benzoquinone subunits alternate with one hydroquinone subunit.

In yet another aspect, the invention provides a block copolymer having the formula:

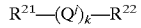

wherein each $R^{21}$ and $R^{22}$ is independently selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted $di(C_1-C_{12})$alkylamino, substituted or unsubstituted arylamino, substituted or unsubstituted diarylamino and halogen; the subscript k is an integer of from 2 to 20; the superscript j is an integer of from 1 to k and indicates the position downstream from $R^21$ of each Q; each $Q^j$ is a para-phenylene block subunit (e.g., $—(Ar^i)_n—$) or a solubility-enhancing subunit (e.g, $—(Ar^j)_m—$) wherein the subscript n is an integer of from 5 to 15; the superscript i is an integer from 1 to n; the subscript m is an integer of from 1 to 5; the superscript j is an integer from 1 to m; each $Ar^i$ is a substituted or unsubstituted aryl group linked in a manner that maintains a coplanar orientation relative to adjacent $Ar^i$ groups; each $Ar^j$ is selected from a) a 1,4-phenylene group having the formula:

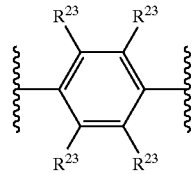

wherein each $R^{23}$ is a member independently selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted $di(C_1-C_{12})$alkylamino, substituted or unsubstituted arylamino, substituted or unsubstituted diarylamino and halogen, with the proviso that at least two of the four $R^{23}$ substituents are independently selected from substituted or unsubstituted $(C_1-C_{12})$alkyl and substituted or unsubstituted $(C_1-C_{12})$alkoxy, and b) an aryl biradical selected from 1,4-naphthylene, 1,4-anthrylene, 9,10-anthrylene, 5,6,7,8-tetrahydronaphth-1,4-ylene, 9,9',10,10'-tetra($C_1-C_{12}$)alkyl-9,10-dihydroanthr-1,4-ylene, 9,9'10,10'-tetraaryl-9,10-dihydroanthr-1,4-ylene, 9,9'10,10'-tetra($C_1-C_{12}$)alkyl-9,10-dihydroanthr-2,6-ylene, and 9,9'10,10'-tetraaryl-9,10-dihydroanthr-1,4-ylene.

In one group of preferred embodiments, $Q^1$, $Q^3$ and $Q^5$ are block para-phenylene subunits and $Q^2$, $Q^4$ and $Q^6$ are solubility enhancing subunits. In another group of preferred embodiments, $Q^1$, $Q^3$, $Q^5$ and $Q^7$ are solubility enhancing subunits and $Q^2$, $Q^4$ and $Q^6$ are block para-phenylene subunits.

In still another aspect, the present invention provides a branched polymeric aromatic compound having the formula:

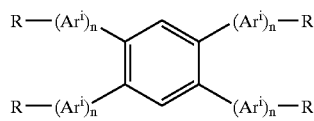

wherein each R is selected from substituted or unsubstituted $(C_1-C_{12})$alkyl, substituted or unsubstituted $(C_1-C_{12})$alkoxy, phenyl and halogen; the subscript n is an integer of from 3 to 8; the superscript i is an integer of from 1 to n and denotes the positions of each Ar away from the central tetrasubstituted phenyl ring; and each $Ar^i$ is a substituted or unsubstituted aryl group that can be the same or different from $Ar^i$ at any other position; with the provisos that the $Ar^i$ groups are linked together in a 1,4-paraphenylene manner.

In still another aspect, the present invention provides a method of preparing a polymeric OLED material on a solid support, the method comprising:

(a) contacting a solid support-bound aryl diazonium salt with 3,6-dichloroquinone under conditions sufficient to form a solid support-bound aryl quinone derivative; and (b) contacting the solid support-bound aryl quinone derivative with a diazonium compound having the formula:

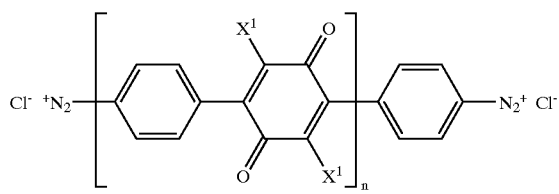

wherein each $X^1$ is a blocking group and the subscript n is an integer of from 0 to 4; under conditions sufficient to form an intermediate poly OLED material;

(c) repeating steps (a) and (b) from 2 to 70 times; and (d) contacting the product of step (c) with a terminating diazonium compound having the formula:

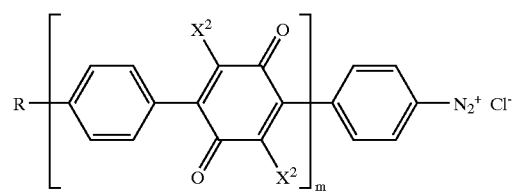

wherein each $X^2$ is a blocking group, R is selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted di($C_1-C_{12}$)alkylamino, substituted or unsubstituted arylamino and substituted or unsubstituted diarylamino; and m is an integer of from 0 to 4.

In one group of embodiments, an intermediate poly OLED material is produced having the formula:

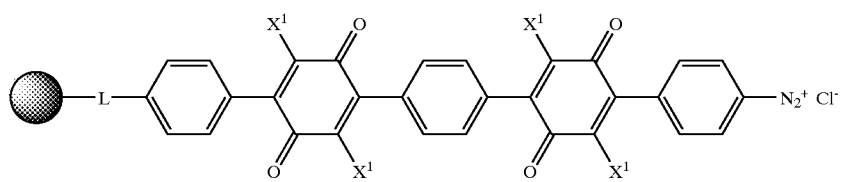

wherein L is a linking group; the shaded sphere is a solid support; and $X^1$ is a member selected from halogen, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, and substituted or unsubstituted di($C_1-C_{12}$)alkylamino. Preferably, the solid support is selected from glass, tin oxide, indium oxide, and mixtures thereof.

In yet another aspect, the present invention provides a solid support-bound poly OLED material formed by the methods above.

In another aspect, the present invention provides a polyfurano ladder oligomer having the formula:

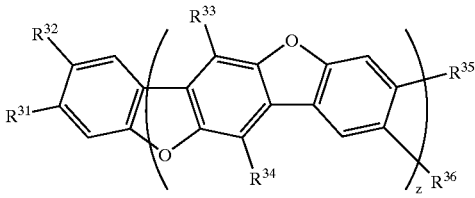

wherein the subscript z is an integer of from 2 to 7; each of $R^{31}$, $R^{32}$, $R^{33}$, $R^{34}$, $R^{35}$, $R^{36}$ is independently selected from H, substituted or unsubstituted ($C_1$–$C_{12}$)alkyl, substituted or unsubstituted ($C_1$–$C_{12}$)alkoxy and halogen. Preferably, $R^{32}$ and $R^{35}$ are each H. More preferably, z is an integer of from 2 to 4; and $R^{32}$ and $R^{35}$ are each H. Methods of preparing the polyfurano ladder oligomers by photoreaction of an appropriate precursor are also provided.

In another aspect, the present invention provides a method of forming a light emitting polymer, the method comprising exposing an oligomeric para-phenylene compound of claim 1 having attached acrylate ester groups to sufficient ultraviolet light to form a light emitting polymer comprising a plurality of oligomeric para-phenylene compounds covalently attached to each other via ester and ether linkages.

In yet another aspect, the present invention provides a method of forming a light emitting polymer, the method comprising exposing a polyfurano ladder oligomer having attached acrylate ester groups to sufficient ultraviolet light to form a light emitting polymer comprising a plurality of said polyfurano ladder oligomers covalently attached to each other via ester and ether linkages.

DETAILED DESCRIPTION OF THE INVENTION

Abbreviations and Definitions

Figure 1:
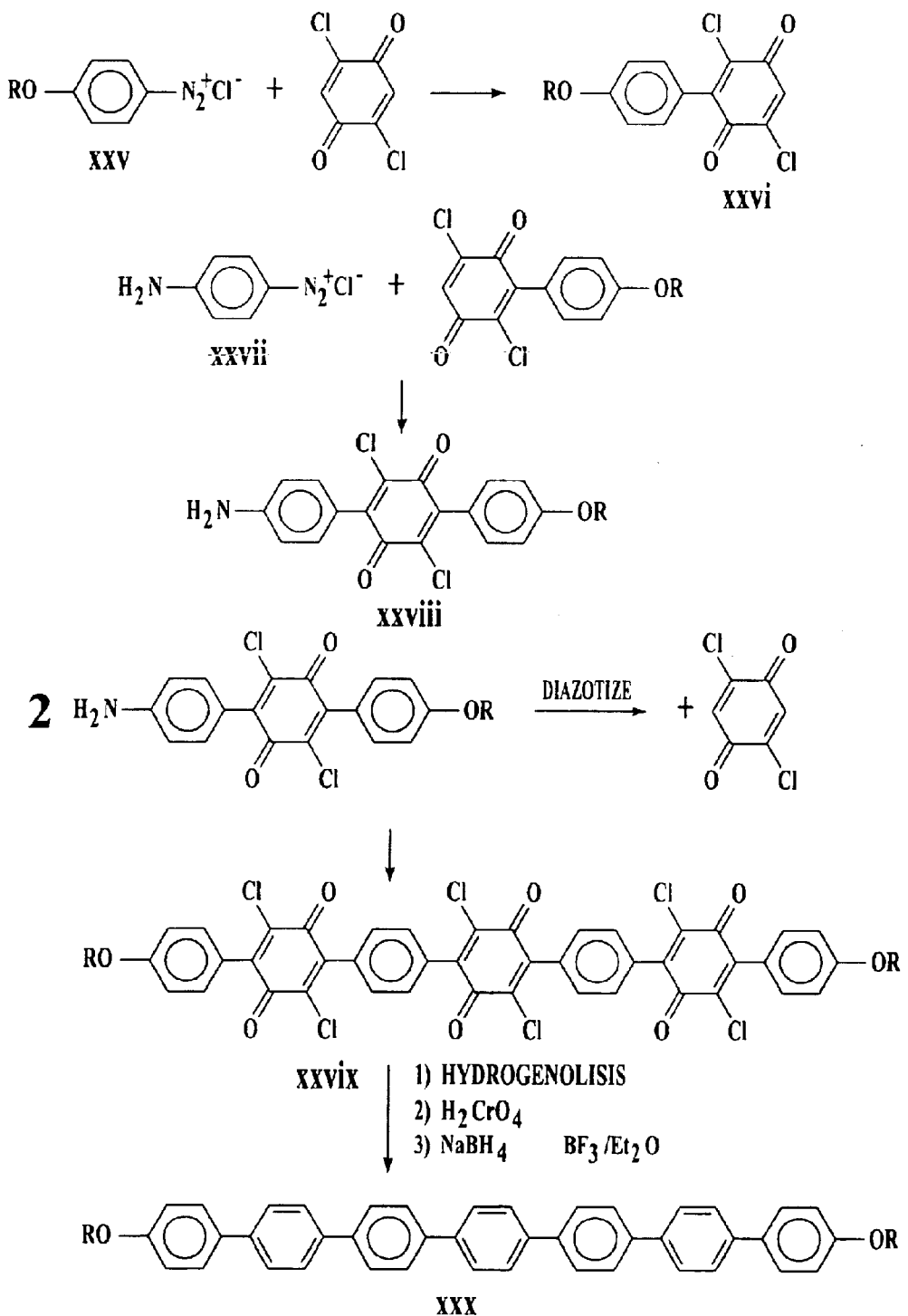
FIG. 1 illustrates one scheme for preparing oligomeric para-phenylene compounds.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$–$C_8$ means one to eight carbons). Examples of saturated hydrocarbon radicals include groups such as methyl, ethyl, n-propyl, isopropyl, n-butyl, t-butyl, isobutyl, sec-butyl, cyclohexyl, (cyclohexyl)ethyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below as "heteroalkyl," "cycloalkyl" and "alkylene." The term "alkylene" by itself or as part of another substituent means a divalent radical derived from an alkane, as exemplified by —$CH_2CH_2CH_2CH_2$—. Typically, an alkyl group will have from 1 to 24 carbon atoms, with those groups having 8 or fewer carbon atoms being preferred in the present invention.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively. Similarly, the term dialkylamino (or diarylamino) refers to an amino group having two attached alkyl groups (or aryl groups) that can be the same or different.

The term "heteroalkyl," by itself or in combination with another term, means, unless otherwise stated, a stable straight or branched chain, or cyclic hydrocarbon radical, or combinations thereof, consisting of the stated number of carbon atoms and from one to three heteroatoms selected from the group consisting of O, N, Si and S, and wherein the nitrogen and sulfur atoms may optionally be oxidized and the nitrogen heteroatom may optionally be quatemized. The heteroatom(s) O, N and S may be placed at any interior position of the heteroalkyl group. The heteroatom Si may be placed at any position of the heteroalkyl group, including the position at which the alkyl group is attached to the remainder of the molecule. Examples include —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$—S(O)—$CH_3$, —$CH_2$—$CH_2$—S($O)_2$—$CH_3$, —CH=CH—O—$CH_3$, —Si($CH_3)_3$, $CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3)_3$.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include cyclopentyl, cyclohexyl, 1-cyclohexenyl, 3-cyclohexenyl, cycloheptyl, and the like. Examples of heterocycloalkyl include 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom.

The term "aryl," employed alone or in combination with other terms (e.g., aryloxy, arylthioxy, arylalkyl) means, unless otherwise stated, an aromatic substituent which can be a single ring or multiple rings (up to three rings) which are fused together or linked covalently. The rings may each contain from zero to four heteroatoms selected from N, O, and S, wherein the nitrogen and sulfur atoms are optionally oxidized, and the nitrogen atom(s) are optionally quaternized. The aryl groups that contain heteroatoms may be referred to as "heteroaryl" and can be attached to the remainder of the molecule through a heteroatom Non-limiting examples of aryl groups include phenyl, 1-naphthyl, 2-naphthyl, 4-biphenyl, pyrazinyl, 2-pyridyl, 3-pyridyl, 4-pyridyl, 2-pyrimidyl, 4-pyrimidyl, 1-isoquinolyl, 5-isoquinolyl, 5-quinoxalinyl and 5-quinolyl. Substituents for each of the above noted aryl ring systems are selected from the group of acceptable substituents described below. The term "arylalkyl" is meant to include those radicals in which an aryl group is attached to an alkyl group (e.g., benzyl, phenethyl, pyridylmethyl and the like) or a heteroalkyl group (e.g., phenoxymethyl, 2-pyridyloxymethyl, 3-(1-naphthyloxy)propyl, and the like). When the above-noted aryl groups occupy "interior" positions in an OLED material, one of skill in the art will understand that the linkage listed will also include the appropriate "para phenylene" position. For example, recitation above of 2-pyridyl will also include a pyridyl ring attached to other aryl rings via the 2- and 5-positions.

Each of the above terms (e.g., "alkyl," "heteroalkyl" and "aryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) can be a variety of groups selected from: —OR', =O, =NR', =N—OR', —NR'R", —SR', —halogen, —SiR"R'", —OC(O)R', —C(O)R', —CO$_2$R', CONR'R", —OC(O)NR'R", —NR"C(O)R', —NR'—C(O)NR"R'", —NR" (O)$_2$R', —NH—C(NH$_2$)=NH, —NR'C(NH$_2$)=NH, —NH—C(NH$_2$)=NR', —S(O)R', S(O)$_2$R', —S(O)$_2$NR'R", —CN and —NO$_2$ in a number ranging from zero to (2N+1), where N is the total number of carbon atoms in such radical. One of skill in the art will appreciate that the extreme end, 2N+1, when N is 2 or more, is meant to include those polyhaloalkyl groups such as perfluoroethyl and the like. The groups R', R" and R'" each independently refer to hydrogen, unsubstituted($C_1$–$C_8$)alkyl and heteroalkyl, unsubstituted aryl, aryl substituted with 1–3 halogens, unsubstituted alkyl, alkoxy or thioalkoxy groups, or aryl-($C_1$–$C_4$)alkyl groups. When R' and R" are attached to the same nitrogen atom, they can be combined with the nitrogen atom to form a 5-, 6-, or 7-membered ring. For example, —NR'R" is meant to include 1-pyrrolidinyl and 4-morpholinyl. From the above discussion of substituents, one of skill in the art will understand that the term "alkyl" in its broadest sense is meant to include groups such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). Preferably, the alkyl groups will have from 0–3 substituents, more preferably 0, 1, or 2 substituents, unless otherwise specified.

Similarly, substituents for the aryl and heteroaryl groups are varied and are selected from: -halogen, —OR', —OC(O)R', —NR'R", —SR', —R', —CN, —NO$_2$, —CO$_2$R', —CONR'R", —C(O)R', —OC(O)NR'R", —NR"C(O)R', —NR"C(O)$_2$R', —NR'—C(O)NR"R'", —NH—C(NH$_2$) =NH, —NR'C(NH$_2$)=NH, —NH—C(NH$_2$)=NR', —S(O)R', —S(O)$_2$R', —S(O)$_2$NR'R", —N$_3$,—CH(Ph)$_2$, perfluoro($C_1$–$C_4$)alkoxy, and perfluoro($C_1$–$C_4$)alkyl, in a number ranging from zero to the total number of open valences on the aromatic ring system; and where R', R" and R'" are independently selected from hydrogen, ($C_1$–$C_8$)alkyl and heteroalkyl, unsubstituted aryl and heteroaryl, (unsubstituted aryl)-($C_1$–$C_4$)alkyl, and (unsubstituted aryl) oxy-($C_1$–$C_4$)alkyl.

As used herein, the term "heteroatom" is meant to include oxygen (O), nitrogen (N), sulfur (S) and silicon (Si).

General

A polyphenylene oligomer, p-hexaphenyl (PHP) has poor solubility, but can be vacuum sublimed onto a substrate surface to produce a stable and highly efficient electroluminescent device. By selectively introducing substituents onto the polyphenylene oligomer, new OEL materials can be prepared which alter the emission spectrum and allow dissolution in common solvents.

The present invention provides compounds, compositions and methods for the preparation of OEL materials. In general, the materials can be constructed using an extension of the coupling of aryl diazonium salts with quinones (see, Koch, U.S. Pat. No. 4,288,147). Thus, the linear non-condensed polycyclic quinone produced by Koch can provide a convenient synthetic pathway to a variety of substituted oligomeric paraphenylene compounds. FIG. 1 provides a general method to the preparation of an alkoxy-substituted heptaphenyl compound. In this scheme, the alkoxy groups can be the same or different. Additionally, the chlorine substituents on benzoquinone (2,5-dichloro-1,4-benzoquinone) serve to direct the subsequent arylation reactions into a proper 1,4-paraphenylene substitution pattern, and can be further manipulated or reduced at a later stage of synthesis.

Other compositions of the invention include "branched" polymers of aryl groups, block copolymers, polyfurano ladder oligomers, as well as crosslinked oligomeric paraphenylene compounds.

DESCRIPTION OF THE EMBODIMENTS

Oligomeric Para-Phenylene Compounds

In one aspect, the present invention provides an oligomeric para-phenylene compound having the formula:

$$R^1\text{—}(Ar^i)_n\text{—}R^2 \qquad (I)$$

wherein the subscript n is an integer of from 5 to 15; the superscript i is an integer of from 1 to n and denotes the position downstream from $R^1$; each $Ar^i$ is a substituted or unsubstituted aryl group; $R^1$ and $R^2$ are each substituents that increase the solubility of the para-phenylene compound in nonpolar organic solvents relative to the solubility of the corresponding compound wherein $R^1$ and $R^2$ are hydrogen; with the proviso that the $Ar^i$ groups are linked together in a 1,4-paraphenylene manner. Thus, the formula above is meant to include compounds represented by, for example, $R^1$—$Ar^1$—$Ar^2$—$Ar^3$—$Ar^4$—$Ar^5$—$Ar^6$—$R^2$; $R^1$—$Ar^1$—$Ar^2$—$Ar^3$—$Ar^4$—$Ar^5$—$Ar^6$—$Ar^7$—$Ar^8$—$Ar^9$—$R^2$; and $R^1$—$Ar^1$—$Ar^2$—$Ar^3$—$Ar^4$—$Ar^5$—$Arl^6$—$Arl^7$—$Arl^8$—$Ar^9$—$Ar^{10}$—$Ar^{11}$—$R^2$, wherein each of the Ar groups can be the same or different, but wherein a coplanar arrangement is maintained.

Accordingly, in the present invention, the phrase "linked together in a 1,4-paraphenylene manner" refers to a linkage between aryl (or arylene) groups in which a coplanar orientation is maintained that allows cross conjugation and electron delocalization between rings. For example, phenyl (or phenylene) is linked in a 1,4 manner wherein adjacent $Ar^i$ groups are attached at the 1- and 4-positions (relative to each other) on the phenyl or phenylene ring. Similarly, for fused polycyclic ring systems (e.g., naphthylene), the adjacent $Ar^i$ groups are attached at the 2- and 6-positions and not the 1- and 4-positions. In this manner, electron flow is not interrupted by twisting of the naphthylene ring out of a coplanar arrangement with adjacent rings.

In one group of preferred embodiments, the $Ar^i$ groups are independently selected from unsubstituted phenylene and phenylene having from 1 to 4 fluoro substituents. In another group of preferred embodiments, the $Ar^i$ groups are independently selected from unsubstituted phenylene, phenylene having from 1 to 4 fluoro substituents; and substituted or unsubstituted fused polycyclic aryl with the proviso that any fused polycyclic aryl groups are linked in the compound in a manner that maintains a coplanar orientation relative to the adjacent $Ar^i$ groups. More preferably, the fused polycyclic aryl groups are selected from substituted or unsubstituted 2,6-naphthylene, 2,7-phenanthrylene, 2,6-anthrylene, and 2,6-carbazolylidene, with the proviso that the substituents on the fused polycyclic rings do not disturb the coplanar arrangement of the $Ar^i$ groups.

In another group of preferred embodiments, the subscript n is an integer of from 5 to 9. Still further preferred are those embodiments in which the subscript n is 7 and $Ar^3$ and $Ar^5$ are substituted or unsubstituted 2,6-naphthylene.

Preferably the substituents $R^1$ and $R^2$ are selected to increase the solubility of the oligomer in a nonpolar organic solvent such as toluene or xylene, relative to the solubility of the oligomer wherein $R^1$ and $R^2$ are each hydrogen. Accordingly, preferred embodiments are those in which $R^1$ and $R^2$ each independently have the formula:

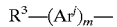

$$R^3\text{—}(Ar^j)_m\text{—}$$

wherein the subscript m is an integer of from 1 to 5; the superscript j is an integer of from 1 to m and denotes the position downstream of (or away from) $R^3$ for each $Ar^j$; and each $Ar^j$ is selected from:

a) a 1,4-phenylene group having the formula:

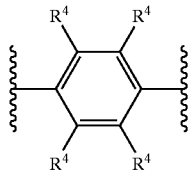

wherein each $R^4$ is independently selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$ alkylthio, substituted or unsubstituted $di(C_1-C_{12})$ alkylamino, substituted or unsubstituted arylamino, substituted or unsubstituted diarylamino and halogen, with the proviso that at least two of the four $R^4$ substituents are independently selected from substituted or unsubstituted $(C_1-C_{12})$alkyl and substituted or unsubstituted $(C_1-C_{12})$ alkoxy, and b) an aryl biradical selected from 1,4-naphthylene, 1,4-anthrylene, 9,10-anthrylene, 5,6,7,8-tetrahydronaphth-1,4-ylene, 9,9',10,10'-tetra$(C_1-C_{12})$alkyl-9,10-dihydroanthr-1,4-ylene, 9,9'10,10'-tetraaryl-9,10-dihydroanthr-1,4-ylene, 9,9'10,10'-tetra$(C_1-C_{12})$alkyl-9,10-dihydroanthr-2,6-ylene, and 9,9'10,10'-tetraaryl-9,10-dihydroanthr-1,4-ylene; and $R^3$ is selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted $di(C_1-C_{12})$alkylamino, substituted or unsubstituted arylamino, substituted or unsubstituted diarylamino and halogen.

For these embodiments, the $R^3$ group and $Ar^i$ groups are selected to interrupt the linear rod-like symmetry achieved with the oligomeric $(Ar^i)_n$ portion of the compound. Accordingly, for the aryl groups in this part of the molecule, substituents are selected and sites of attachment are selected that result in $Ar^i$ groups twisting out of a coplanar arrangement and thereby increasing the solubility of the entire oligomer. In one group of preferred embodiments, each $Ar^i$ is a 1,4-phenylene group having the formula:

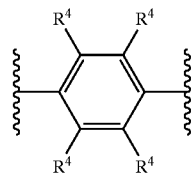

wherein each $R^4$ is independently selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$ alkylthio, substituted or unsubstituted $di(C_1-C_{12})$ alkylamino, substituted or unsubstituted arylamino, substituted or unsubstituted diarylamino and halogen, with the proviso that at least two of the four $R^4$ substituents are independently selected from substituted or unsubstituted $(C_1-C_{12})$alkyl and substituted or unsubstituted $(C_1-C_{12})$ alkoxy. More preferably, at least two of the four $R^4$ substituents are substituted or unsubstituted $(C_1-C_{12})$alkoxy.

In other preferred embodiments, m is an integer of from 1 to 3 and each $Ar^i$ is a substituted or unsubstituted ring system selected from 1,4-naphthylene, 1,4-anthrylene, 9,10-anthrylene, 5,6,7,8-tetrahydronaphth-1,4-ylene, 9,9',10,10'-tetra$(C_1-C_{12})$alkyl-9,10-dihydroanthr-1,4-ylene, 9,9'10,10'-tetraaryl-9,10-dihydroanthr-1,4-ylene, 9,9'10,10'-tetra$(C_1-C_{12})$alkyl-9,10-dihydroanthr-2,6-ylene, and 9,9'10,10'-tetraaryl-9,10-dihydroanthr-1,4-ylene. More preferably, m is one or two and each $Ar^i$ is selected from substituted or unsubstituted 1,4-naphthylene, 1,4-anthrylene and 9,10-anthrylene.

In still other preferred embodiments, $R^3$ is selected from substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $di(C_1-C_{12})$alkylamino, substituted or unsubstituted arylamino, and substituted or unsubstituted diarylamino.

In another group of particularly preferred embodiments, the oligomeric para-phenylene compound has the formula:

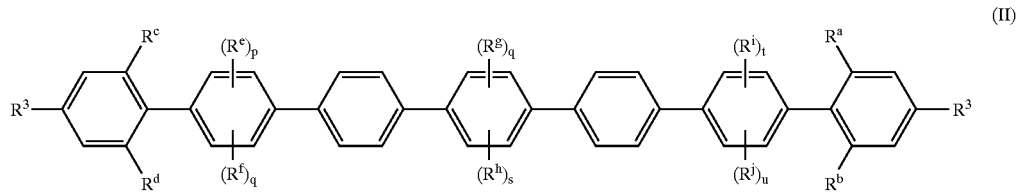

(II)

wherein each of $R^a$, $R^b$, $R^c$ and $R^d$ is independently selected from substituted or unsubstituted $(C_1-C_{12})$alkyl and substituted or unsubstituted $(C_1-C_{12})$alkoxy; the subscripts p, q, r, s, t and u are each independently integers of from 0 to 2; and each of $R^e$, $R^f$, $Rg^g$, $R^h$, $R^i$ and $R^j$ are independently a halogen, preferably fluorine. Still further preferred are those embodiments in which each of $R^a$, $R^b$, $R^c$ and $R^d$ is substituted or unsubstituted $(C_1-C_{12})$alkoxy, more preferably methoxy or ethoxy; the subscripts p, q, r, s, t and u are each 1; and each of $R^e$, $R^f$, $R^g$, $R^h$, $R^i$ and $R^j$ are halogen, preferably fluorine.

Scheme 1 is illustrative of methods useful in preparing compounds of this aspect of the invention.

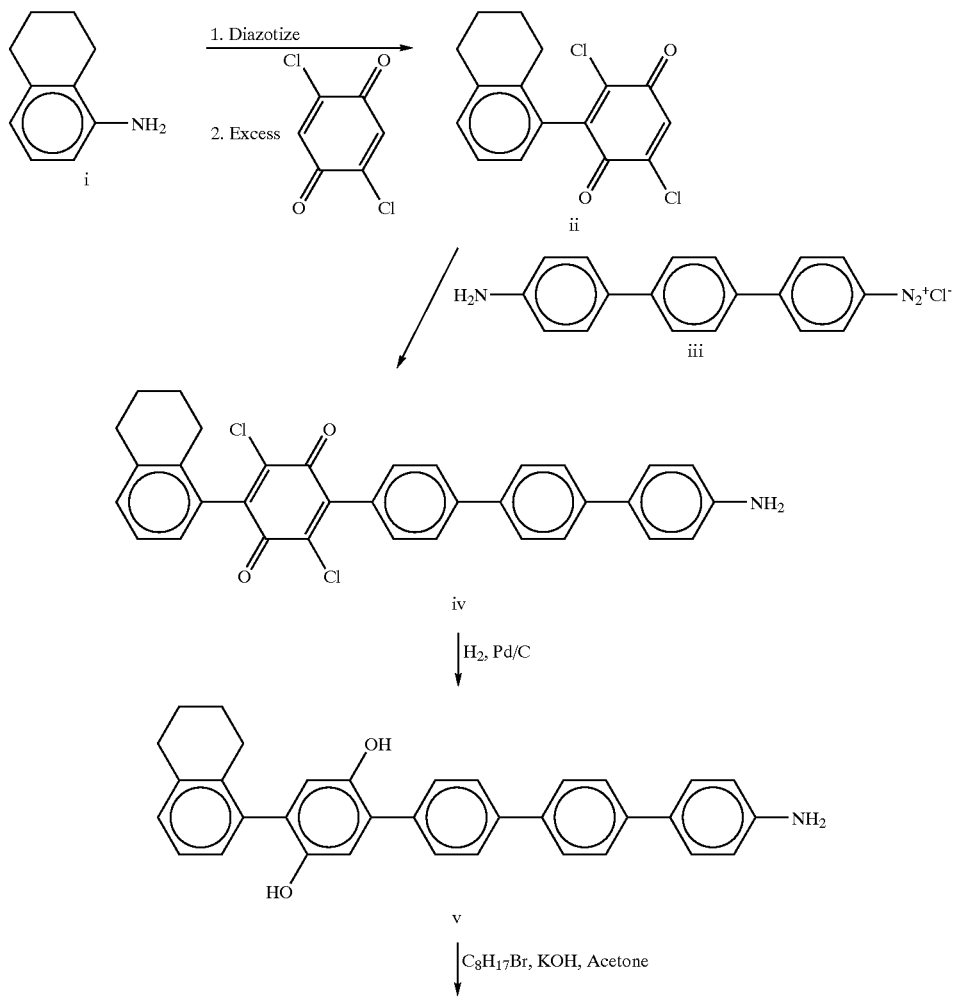

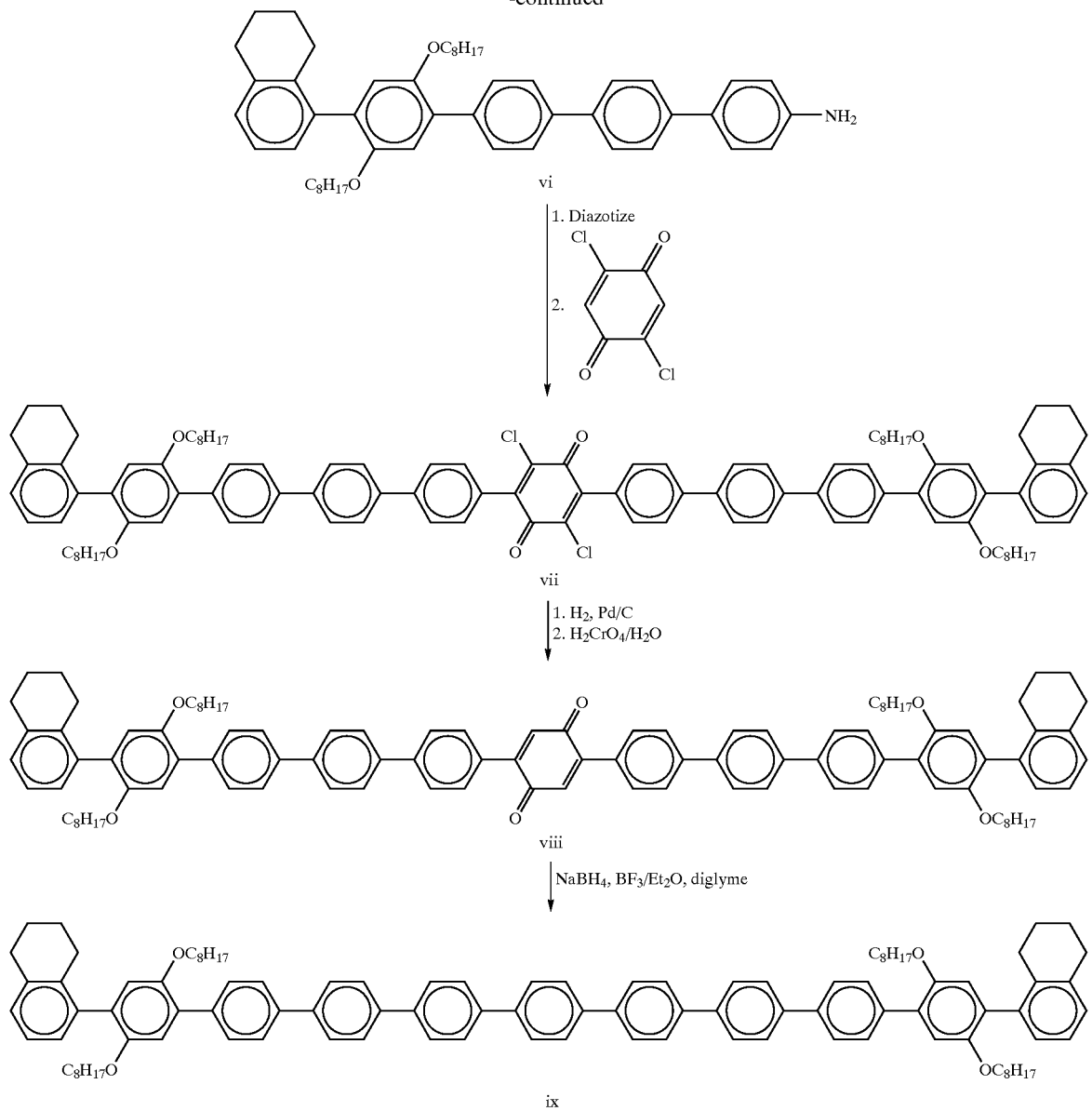

vi vii viii ix

Synthesis in Scheme 1, begins with 5,6,7,8-tetrahydro-1-naphthylamine i (Aldrich Chemical Co., Milwaukee, Wisc., USA). Compound i can be converted to its corresponding diazonium salt according to established methods. Subsequent treatment of the diazonium salt with excess 2,5-dichloro-1,4-benzoquinone produces ii. Reaction of ii with iii (produced by diazotization of 4,4"-diamino-p-terphenyl (from Lancaster Synthesis, Inc.)) provides the adduct iv, which can be reduced to dihydroxy compound v and alkylated with, for example, octyl bromide in KOH and acetone, to provide vi. Diazotization of vi and reaction with 0.5 equivalents of 2,5-dichloro-1,4-benzoquinone provides the bis-adduct, vii. The chloro groups of vii can be removed by hydrogenolysis over a palladium on carbon catalyst, and the resulting hydroquinone can be oxidized to the quinone viii using chromic acid. Reduction of viii to ix is accomplished, preferably using sodium borohydride in a solution of boron trifluoride etherate and diglyme.

Additional methodologies utilizing aryl diazonium couplings to produce para-phenylene oligomers of the present invention (and related derivatives) are provided in FIGS. 1–11. One of skill in the art will appreciate that the methods disclosed therein and described in further detail below can be adapted to the preparation of numerous substituted and unsubstituted versions of the claimed compounds, simply by small alterations in the starting materials used.

Branched Para-Phenylene Compounds

In another aspect, the present invention provides a branched polymeric aromatic compound having the formula:

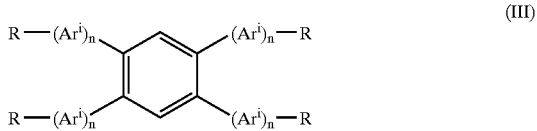

(III)

wherein each R is independently selected from substituted or unsubstituted ($C_1$–$C_{12}$)alkyl, substituted or unsubstituted ($C_1$–$C_{12}$)alkoxy, phenyl and halogen; the subscript n is an integer of from 3 to 8; and each $Ar^i$ is a substituted or unsubstituted aryl group in which the superscript i is an integer denoting the position of each aryl group away from the central tetrasubstituted phenyl ring. In this aspect of the invention, each $Ar^i$ can be the same or different from $Ar^i$ at any other position, with the proviso that the $Ar^i$ groups are linked together in a 1,4-paraphenylene manner.

In preferred embodiments, the subscript n is 3 or 4, more preferably 3. Additionally, each $Ar^1$ and each $Ar^3$ is 1,4-phenylene and each $Ar^2$ is a substituted or unsubstituted 1,4-phenylene, preferably a phenylene substituted with from 1 to 4 fluorine substituents.

Figure 6:
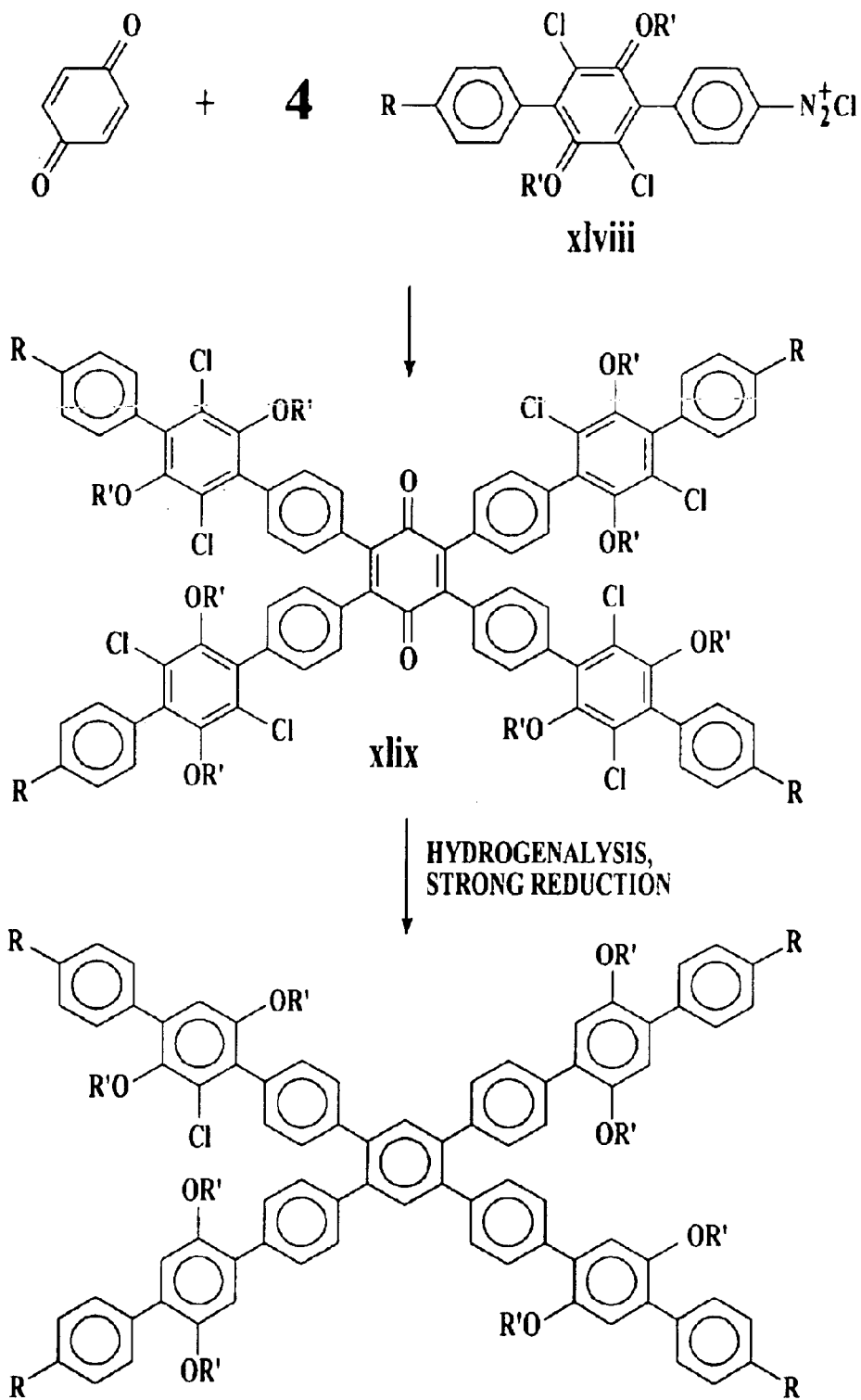
FIG. 6 illustrates one method for preparing "branched" para-phenylene compositions.

A general method for preparing branched oligomers of the present invention is illustrated in FIG. 6 and described in more detail below.

Hydroquinone/Benzoquinone Oligomers

In yet another aspect, the present invention provides compounds having the formula:

$$R^{11}\text{---}(Q^i)_p\text{---}R^{12} \quad \text{(IV)}$$

wherein each $R^1$ and $R^{12}$ is independently selected from H, substituted or unsubstituted ($C_1$–$C_{12}$)alkyl, substituted or unsubstituted ($C_1$–$C_{12}$)alkoxy, substituted or unsubstituted ($C_1$–$C_{12}$)alkylamino, substituted or unsubstituted ($C_1$–$C_{12}$) alkylthio, substituted or unsubstituted di($C_1$–$C_{12}$) alkylamino, substituted or unsubstituted arylamino, substituted or unsubstituted diarylamino and halogen; the subscript p is an integer of from 5 to 200; the superscript i is an integer of from 1 to p and indicates the position downstream from $R^2$ of each Q; each $Q^1$ is a benzoquinone or hydroquinone subunit selected from the formulae:

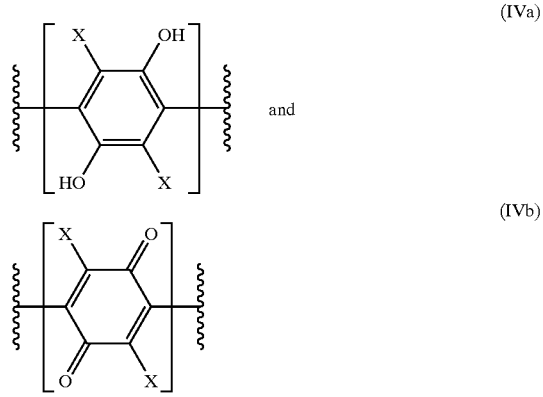

wherein each X is independently selected from H, substituted or unsubstituted ($C_1$–$C_{12}$)alkyl, substituted or unsubstituted ($C_1$–$C_{12}$)alkoxy, substituted or unsubstituted ($C_1$–$C_{12}$)alkylamino, substituted or unsubstituted ($C_1$–$C_{12}$) alkylthio, substituted or unsubstituted di($C_1$–$C_{12}$) alkylamino, substituted or unsubstituted arylamino, substituted or unsubstituted diarylamino and halogen.

In one group of embodiments, the hydroquinone and benzoquinone subunits are present in about a 50:50 ratio. In another group of embodiments, the hydroquinone and benzoquinone subunits alternate in the polymer so that no two hydroquinone subunits are adjacent and no two benzoquinone subunits are adjacent. In yet another group of embodiments, two adjacent hydroquinone subunits alternate with one benzoquinone subunit. In still another group of embodiments, two adjacent benzoquinone subunits alternate with one hydroquinone subunit.

Interestingly, it is likely that the formal ratio of benzoquinone to hydroquinone subunits will be maintained in the final product oligomer (the overall oxidation state of the polymer assembly will be maintained), however the exact placement along the polymer backbone of each of the benzoquinone and hydroquinone subunits may vary. This is due to the facile electron and proton interchange and likely hydrogen bridge bonding between adjacent polymer subunits. By creating an initial material having alternating subunits or groups of subunits, an initial microscopically homogenous material is produced. Facile charge carrier transfer along polymer backbones and the natural bond alternation contributing to bipolaron formation will then alter the microscopic chemical structure.

The hydroquinone and benzoquinone oligomers of the present invention are interesting and useful materials. The two electron oxidation state variation between adjacent benzoquinone and hydroquinone subunits is conducive to bipolaron charge carrier formation and therefore make these materials useful as electron and hole transporting materials.

Scheme 2 illustrates a method for synthesizing a hydroquinone/benzoquinone material.

In this scheme, hydroquinone is mononitrated and reduced to the aniline x, according to standard procedures. The aniline x is again subjected to mononitration and reduction to provide xi. Bis-sulfonylation (with either alkyl or aryl sulfonyl chlorides) can be accomplished using sodium hydride and an appropriate sulfonyl chloride in pyridine to produce xii. Diazotization of each of the aniline amino groups and treatment of the resultant tetrazonium salt with 2,5-dichloro-1,4-benzoquinone provides xiii. Reaction of xiii with two equivalents (or excess) of the monodiazonium salt of xii produces xiv. The diamine, xiv, can be converted to the tetrazonium salt (a bis-diazonium salt), according to established methods of diazotization, and then reacted with 2,5-dichloro-1,4-benzoquinone to provide xv. Hydrogenolysis of xv to remove the chloro substituents, and subsequent oxidation of the intermediate hydroquinone to a benzoquinone results in xvi. The oligomer xvi can be hydrolyzed (e.g., potassium hydroxide and water) and acidified (HCl and water) to produce a target hydroquinone/benzoquinone compound xvii.

Scheme 2

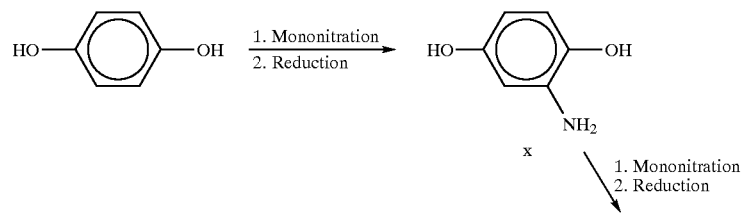

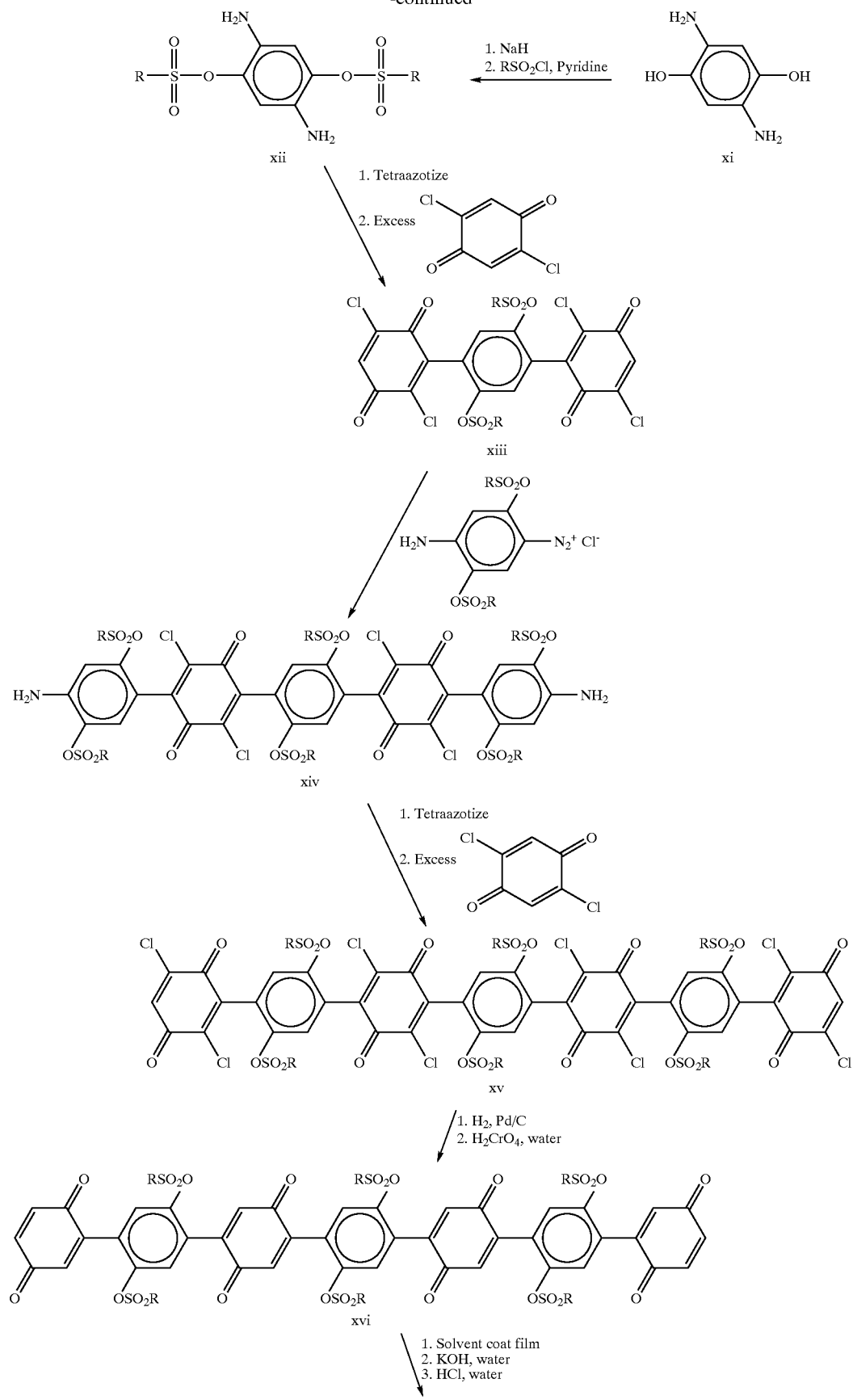

-continued

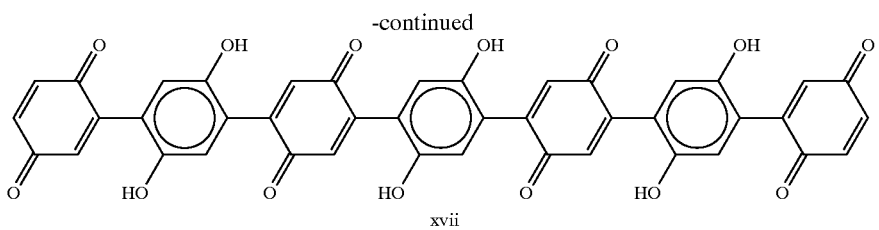

xvii

Polyfurano Ladder Oligomers

In yet another aspect, the present invention provides polyfurano ladder oligomers having the formula:

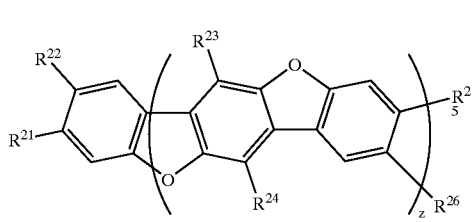

(V)

wherein the subscript z is an integer of from 2 to 7; and each of $R^{21}$, $R^{22}$, $R^{23}$, $R^{24}$, $R^{25}$, $R^{26}$ is independently selected from H, substituted or unsubstituted $(C_1-C_{12})$alkyl, substituted or unsubstituted $(C_1-C_{12})$alkoxy and halogen.

In preferred embodiments, $R^{22}$ and $R^{25}$ are each H. More preferably, the subscript z is an integer of from 2 to 4, and $R^{22}$ and $R^{25}$ are each H. In general, these oligomers can be prepared via photocyclization of certain intermediates described above.

Figure 7:
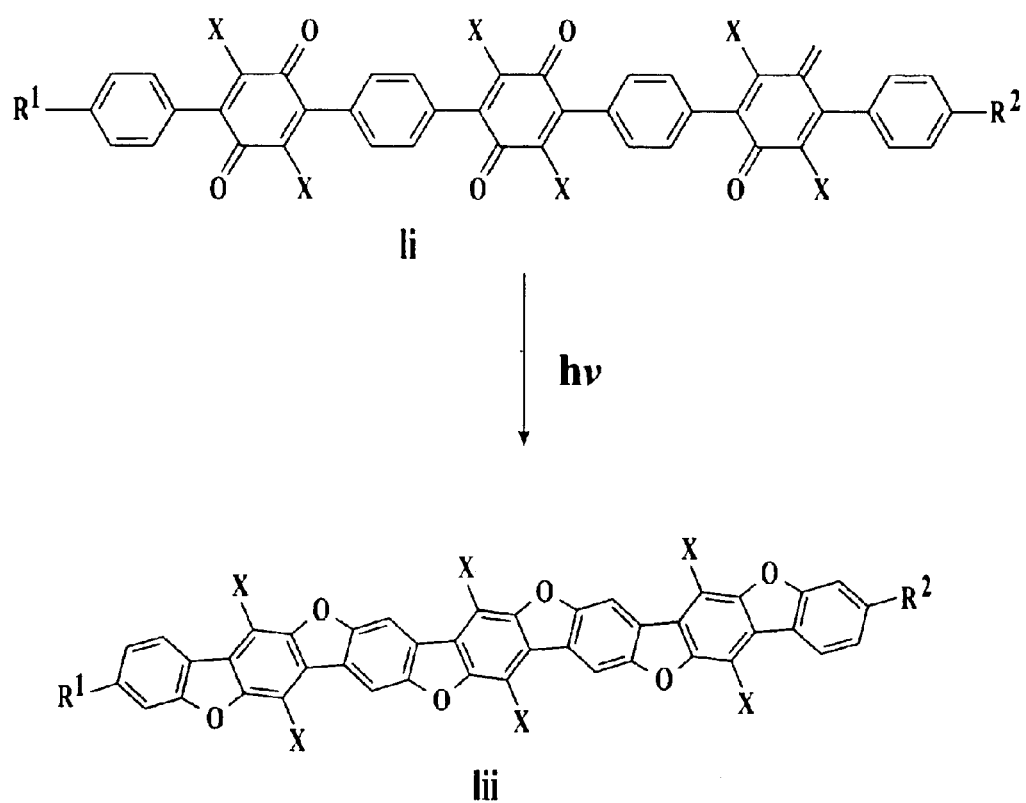
FIGS. 7 and 8 illustrate schemes for the photocyclization of polyquinones, leading to polyfurano ladder oligomers.
Figure 8C:
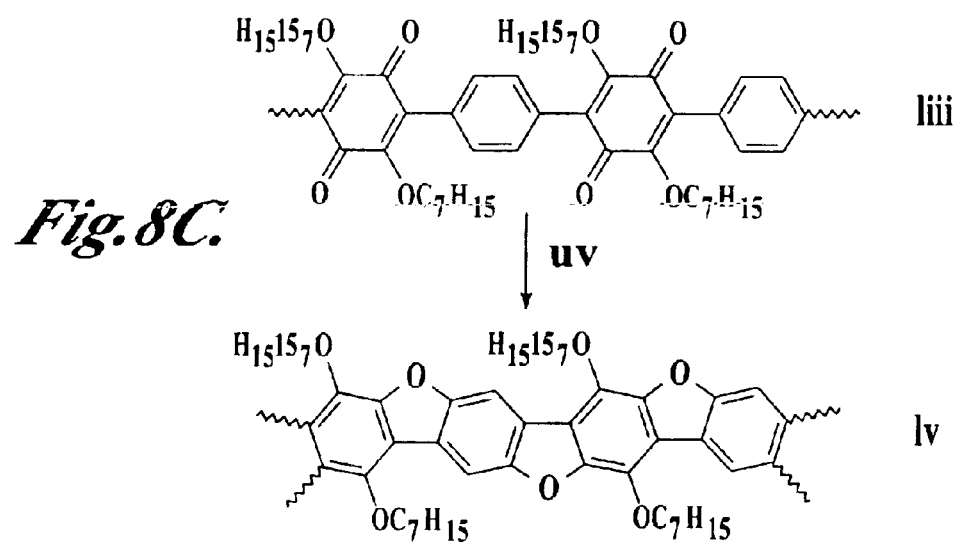

The preparation of polyfurano ladder compounds is illustrated in FIGS. 7 and 8.

The polyfurano ladder compounds have a particular utility in the area of photoresist applications. A portion of their utility resides in the greater solubility of the precursor materials in organic solvents, relative to the polyfurano ladder compounds. For example, an oligomeric or polymeric material containing structural units of formula:

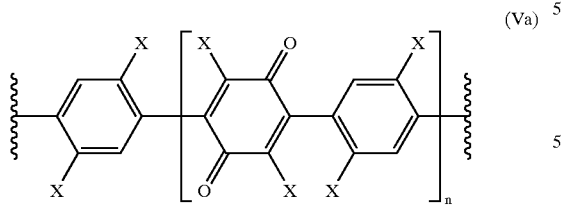

(Va)

wherein X denotes a blocking group (e.g., an alkyl or alkoxy group) can be used as a solvent castable, photopatternable precursor to an organic light emitting diode structure. The castable material can be exposed to IN light through a patterned photomask and converted to a polymeric material containing structural units having the formula:

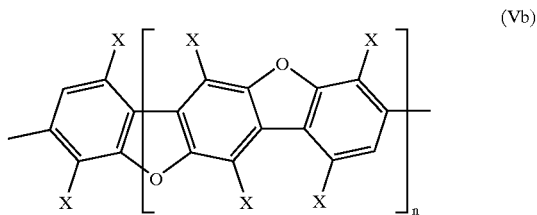

(Vb)

in the photoexposed areas. These structural units render the product polymer less soluble in organic solvents than the precursor. As a result, excess or unreacted precursor can be removed from the casting surface via solvent dissolution to reveal a patterned film of the product polymer that is useful in fabrication or organic light emitting diode structures. Accordingly, the present invention provides such methods.

Block Copolymers

In yet another aspect, the invention provides a block copolymer having the formula:

$$R^{21}-(Q^j)_k-R^{22} \quad (VI)$$

wherein each $R^{21}$ and $R^{22}$ is independently selected from H, substituted or unsubstituted $(C_1-C_{12})$alkyl, substituted or unsubstituted $(C_1-C_{12})$alkoxy, substituted or unsubstituted $(C_1-C_{12})$alkylamino, substituted or unsubstituted $(C_1-C_{12})$alkylthio, substituted or unsubstituted $di(C_1-C_{12})$alkylamino, substituted or unsubstituted arylamino, substituted or unsubstituted diarylamino and halogen; the subscript k is an integer of from 2 to 20; the superscript j is an integer of from 1 to k and indicates the position downstream from $R^{21}$ of each Q; each $Q^j$ is a para-phenylene block subunit or a solubility-enhancing subunit, said subunits selected from the formulae:

wherein the subscript n is an integer of from 5 to 15; the subscript m is an integer of from 1 to 5; each $Ar^i$ is a substituted or unsubstituted aryl group linked in a manner that maintains a coplanar orientation relative to adjacent $Ar^i$ groups; each $Ar^i$ is selected from the group consisting of
a) a 1,4-phenylene group having the formula:

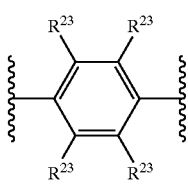

wherein each $R^{23}$ is a member independently selected from the group consisting of H, substituted or unsubstituted ($C_1$–$C_{12}$)alkyl, substituted or unsubstituted ($C_1$–$C_{12}$)alkoxy, substituted or unsubstituted ($C_1$–$C_{12}$)alkylamino, substituted or unsubstituted ($C_1$–$C_{12}$)alkylthio, substituted or unsubstituted di($C_1$–$C_{12}$)alkylamino, substituted or unsubstituted arylamino, substituted or unsubstituted diarylamino and halogen, with the proviso that at least two of the four $R^{23}$ substituents are independently selected from substituted or unsubstituted ($C_1$–$C_{12}$)alkyl and substituted or unsubstituted ($C_1$–$C_{12}$)alkoxy, and b) an aryl biradical selected from the group consisting of 1,4-naphthylene, 1,4-anthrylene, 9,10-anthrylene, 5,6,7,8-tetrahydronaphth-1,4-ylene, 9,9',10,10'-tetra($C_1$–$C_{12}$)alkyl-9,10-dihydroanthr-1,4-ylene, 9,9'10,10'-tetraaryl-9,10-dihydroanthr-1,4-ylene, 9,9'10,10'-tetra($C_1$–$C_{12}$)alkyl-9,10-dihydroanthr-2,6-ylene, 9,9'10,10'-tetraaryl-9,10-dihydroanthr-1,4-ylene.

In one group of preferred embodiments, $Q^1$, $Q^3$ and $Q^5$ are block para-phenylene subunits and $Q^2$, $Q^4$ and $Q^6$ are solubility enhancing subunits. In another group of preferred embodiments, $Q^1$, $Q^3$, $Q^5$ and $Q^7$ are solubility enhancing subunits and $Q^2$, $Q^4$ and $Q^6$ are block para-phenylene subunits.

Scheme 3 illustrates one method of preparing block copolymers of the present invention.

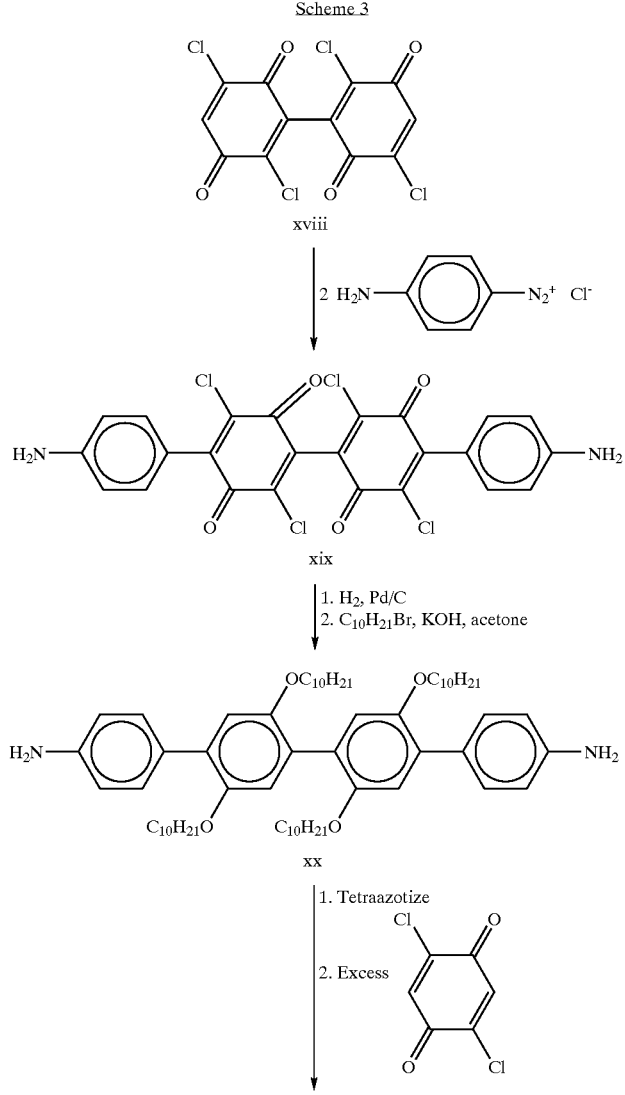

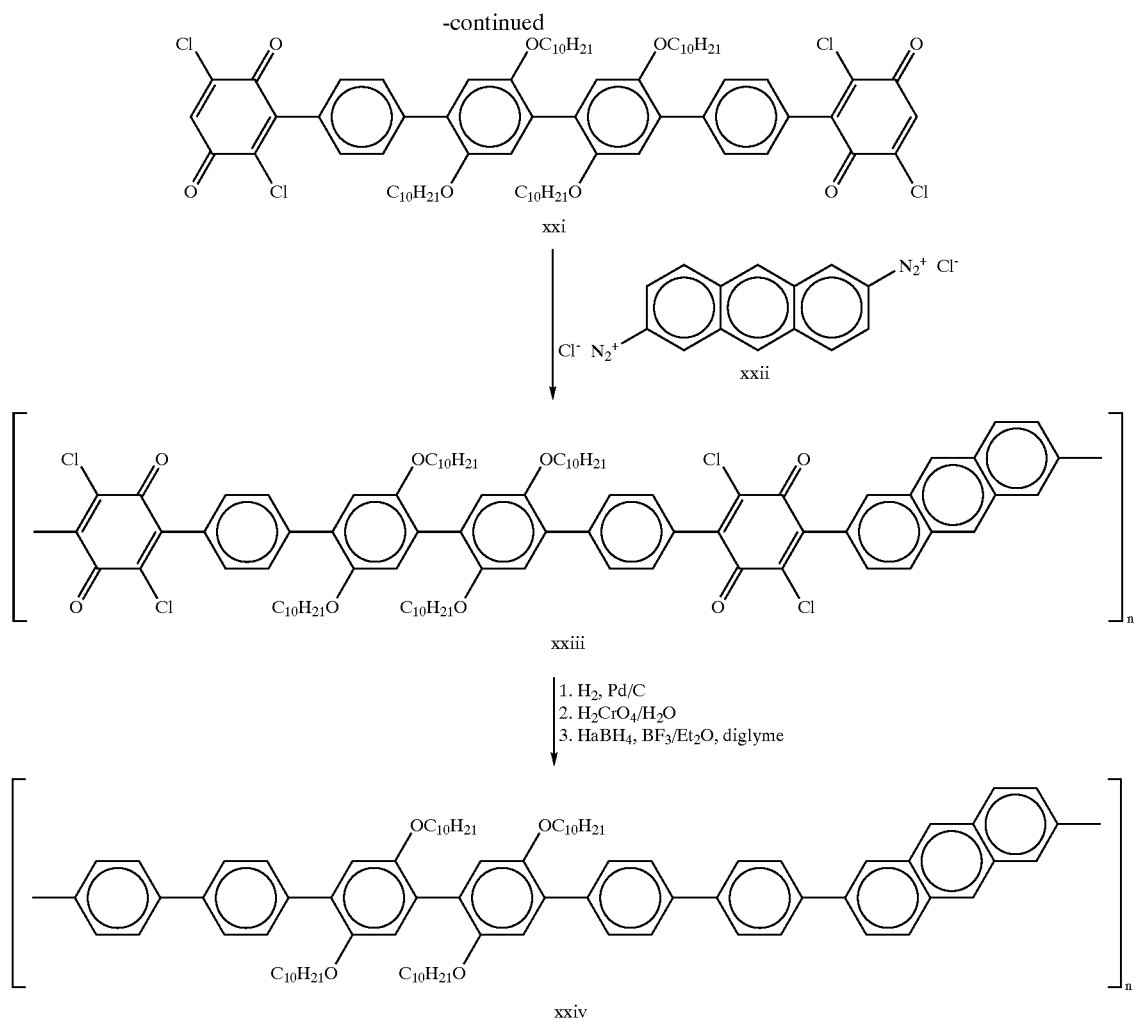

The synthesis shown in Scheme 3 begins with compound xviii (see, Koch, U.S. Pat. No. 4,288,147). Reaction of xviii with two equivalents of 4-aminophenyldiazonium chloride provides xix, which can be reduced (hydrogen with palladium on carbon catalyst) and alkylated with bromodecane to produce xx. This compound can be converted to the corresponding tetrazonium salt using conventional techniques and reacted with excess 2,5-dichloro-1,4-benzoquinone to produce xxi. Reaction of xxi with 2,6-bis(diazonium) anthracene xxii provides a block copolymer intermediate xxiii. The compound xxii can be produced starting with disulfonation of anthraquinone, which can be converted to diaminoanthraquinone, followed by reduction to the diaminoanthracene and tetrazotization of 2,6-diaminoanthracene (see, Lubs, Chemistry of Synthetic Dyes and Pigments, Kreiger Publishing, p. 353; Houben-Weyl, VII-1, p. 244; and Bapat, et al., Tetrahedron Lett. 1(5):15 (1960)). Conversion of xxiii to target copolymer xxiv can be accomplished by a series of reduction/oxidation/reduction steps as shown in Scheme 3.

Methods of Preparing Oligomeric and Branched Para-Phenylene Compounds

The linear oligomers of the present invention can be prepared by a variety of methods.

FIG. 1 illustrates one scheme toward the preparation of the subject compounds. In this Figure, an aryl diazonium salt (xxv) is combined with 2,5-dichloro-1,4-benzoquinone (Aldrich Chemical Co., Milwaukee, Wisc., USA) to produce an aryl substituted benzoquinone (xxvi). Treatment of xxvi with a second aryl diazonium salt (xxvii) provides compound xxviii. To obtain symmetrical OEL materials, two equivalents of xxviii are oxidized to the corresponding diazonium salt and combined with another equivalent of 2,5-dichloro-1,4-benzoquinone to provide xxix. Hydrogenolysis removes the chloro substituents and provides a hydroquinone species which can then be oxidized to the quinone (chromic acid) and reduced to the target compound xxx with sodium borohydride and boron trifluoride etherate. In this scheme, the two O-alkyl groups (shown as OR) can be the same or different depending on diazonium salts used in the conversion of xxviii to xxix. A variety of starting aryl diazonium salts are known in the literature (see, Zollinger, Diazo Chemistry, Vol 1, Aromatic and Heteroaromatic Compounds, Wiley (1994)).

Other substituents can be introduced by means of arylation of quinones. For example, metathesis of 2,5-dichloro-1,4-benzoquinone provides 2,5-difluoro-1,4-benzoquinone xxxi in which the fluoro substituents are resistant to hydrogenolysis (see FIG. 2). Proceeding with the scheme outlined in FIG. 1, but substituting 2,5-difluoro-1,4-benzoquinone for 2,5-dichloro-1,4-benzoquinone, provides compounds of formula xxxii.

Figure 2:
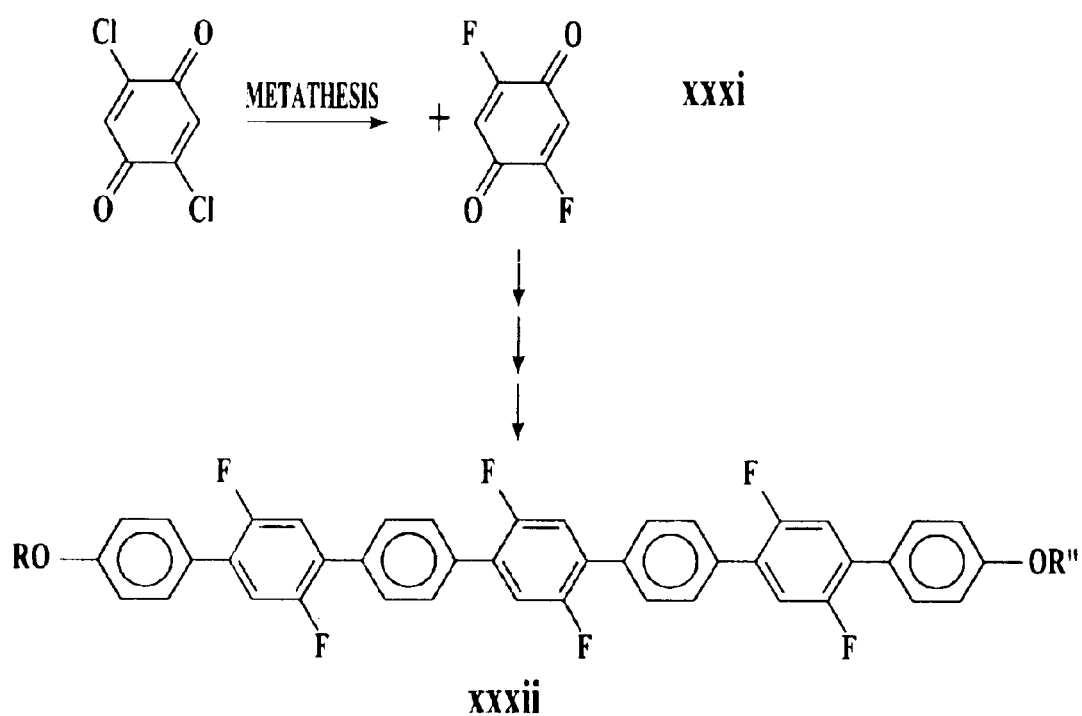
FIG. 2 illustrates a scheme for preparing fluoro- and alkoxy-substituted para-phenylene oligomers.

Generally, FIGS. 1 and 2 provide oligomeric para-phenylene compounds having odd numbers of phenyl rings.

Alternative approaches (shown in FIGS. 3 and 4) result in oligomers of even numbered aryl rings.

Figure 3:
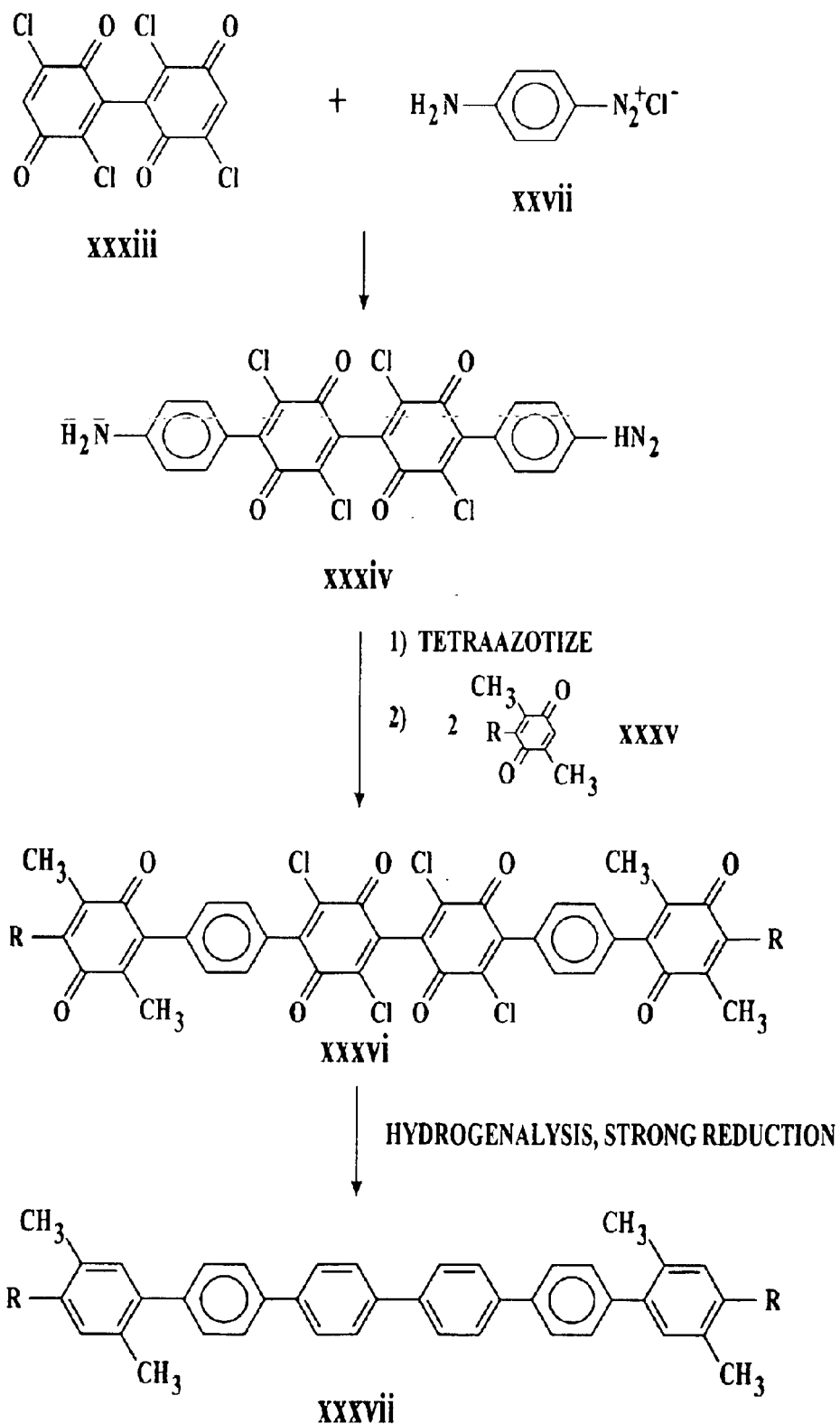
FIGS. 3 and 4 illustrate schemes for preparing para-phenylene compounds having an even number of phenylene groups.

In FIG. 3, the diquinone 2,5,2',5'-tetrachlorobibenzoquinone (xxxiii, see Koch, U.S. Pat. No. 4,288,147) can be treated with two equivalents of diazonium salt xxvii to provide xxxiv. Formation of the bis diazonium salt of xxxiv and reaction of that salt with a suitably blocked benzoquinone (xxxv) provides a compound of formula xxxvi, which upon hydrogenolysis and strong reduction provides the target compound xxxvii.

Figure 4:
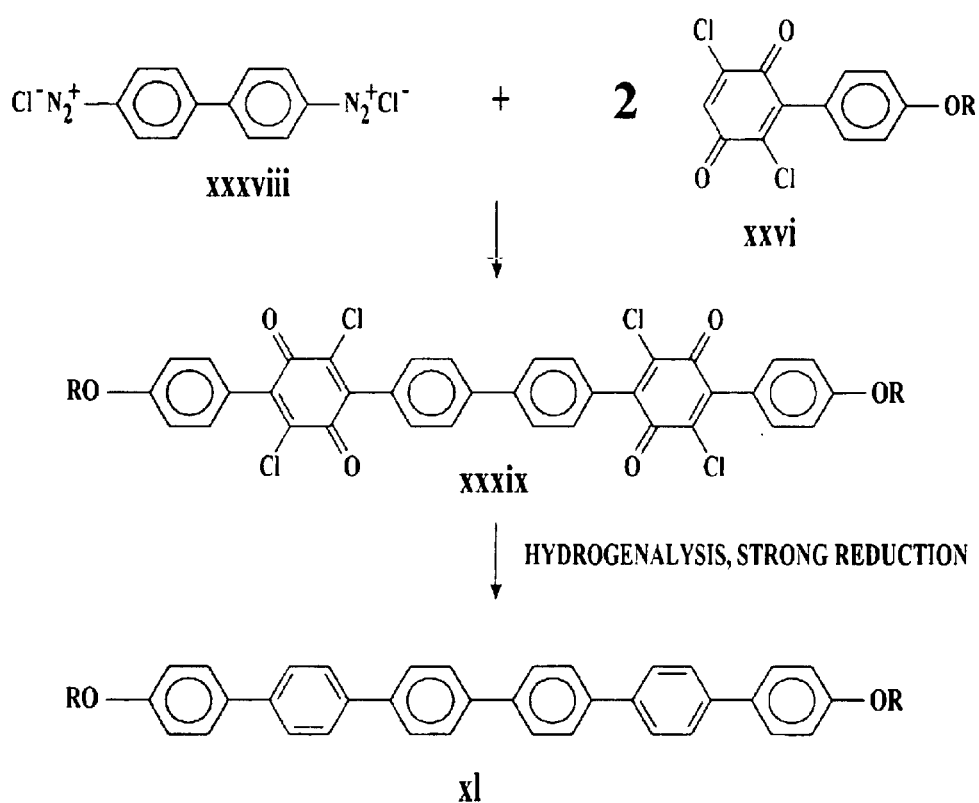

FIG. 4 illustrates another approach for preparing oligomers having an even number of phenylene groups. In this scheme, benzidene diamine is converted to the bis diazonium salt xxxviii for use as a starting material. The diazonium salt is reacted with two equivalents of xxvi, to produce intermediate xxxix. Again, hydrogenolysis and strong reduction of xxxix provides a target compound, xl.

Figure 5:
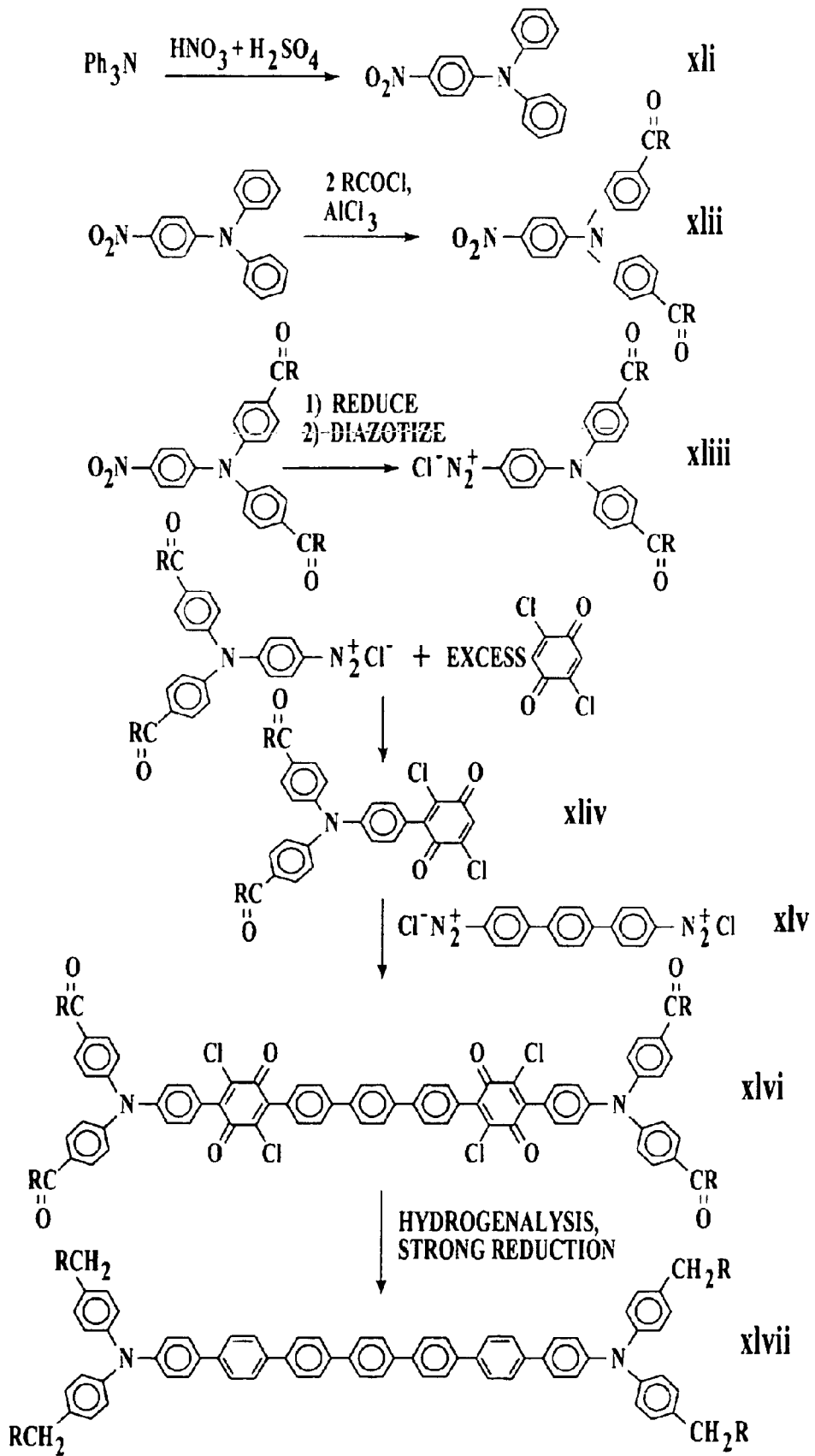
FIG. 5 illustrates a scheme for preparing a para-phenylene oligomer having two diarylamino groups at the termini.

In still other embodiments, the oligomeric para-phenylene compounds have diarylamino groups at each terminus. One route for the preparation of such compounds is illustrated in FIG. 5. Here, triphenylamine (Aldrich Chemical Co.) is nitrated under conditions sufficient to product a mono-nitro product xli. Friedel-Crafts acylation of the two remaining para positions provides xlii, which can be reduced to the corresponding amine, and diazotized to provide xliii. Reaction of xliii with excess 2,5-dichloro-1,4-benzoquinone provides xliv. Coupling of two equivalents of xliv to the bis diazonium salt xlv provides intermediate xlvi. Hydrogenolysis and reduction of xlvi leads to compounds of formula xlvii.

In another group of embodiments, the invention provides branched polymeric aromatic compounds. Such branched oligomers can be produced if the 1,4-benzoquinone does not have the 2- and 5-positions blocked (see FIG. 6). As illustrated in FIG. 6, 1,4-benzoquinone can be treated with four equivalents of a suitable diazonium salt (e.g., xlviii) to provide compound xlix. Hydrogenolysis and reduction of xlix as described for various species above provides a branched polymeric aromatic compound of formula 1.

In yet another group of embodiments, the invention provides polyfurano ladder oligomers. These oligomers can be prepared using intermediates described in the methods above. Accordingly, photocyclization of compounds such as li provides a polyfurano ladder oligomer having the formula lii (see FIG. 7). Substitution of the benzoquinones and diazonium salts used in the preparation of a precursor (e.g., li), can lead to a variety of differently substituted compounds. For example, poly (para-phenylene 2,5-heptyloxy-p-benzoquinonylene, liii) can be produced from 2,5-heptyloxybenzoquinone with tetraazotized 1,4-phenylenediamine (see FIG. 8). Reduction of liii provides the related hydroquinone polymer liv, or can be exposed to UV light to produce a polyfurano ladder oligomer lv.

Preparation of OEL Materials on a Solid Surface

In addition to the methods for preparing oligomeric para-phenylene compounds described above, the present invention further provides methods for the preparation of such materials on a solid support. These methods are useful for preparing such oligomers that will ultimately be cleaved from the support, and also for preparing oligomers that are attached at the site of their utility.

Figure 9A:
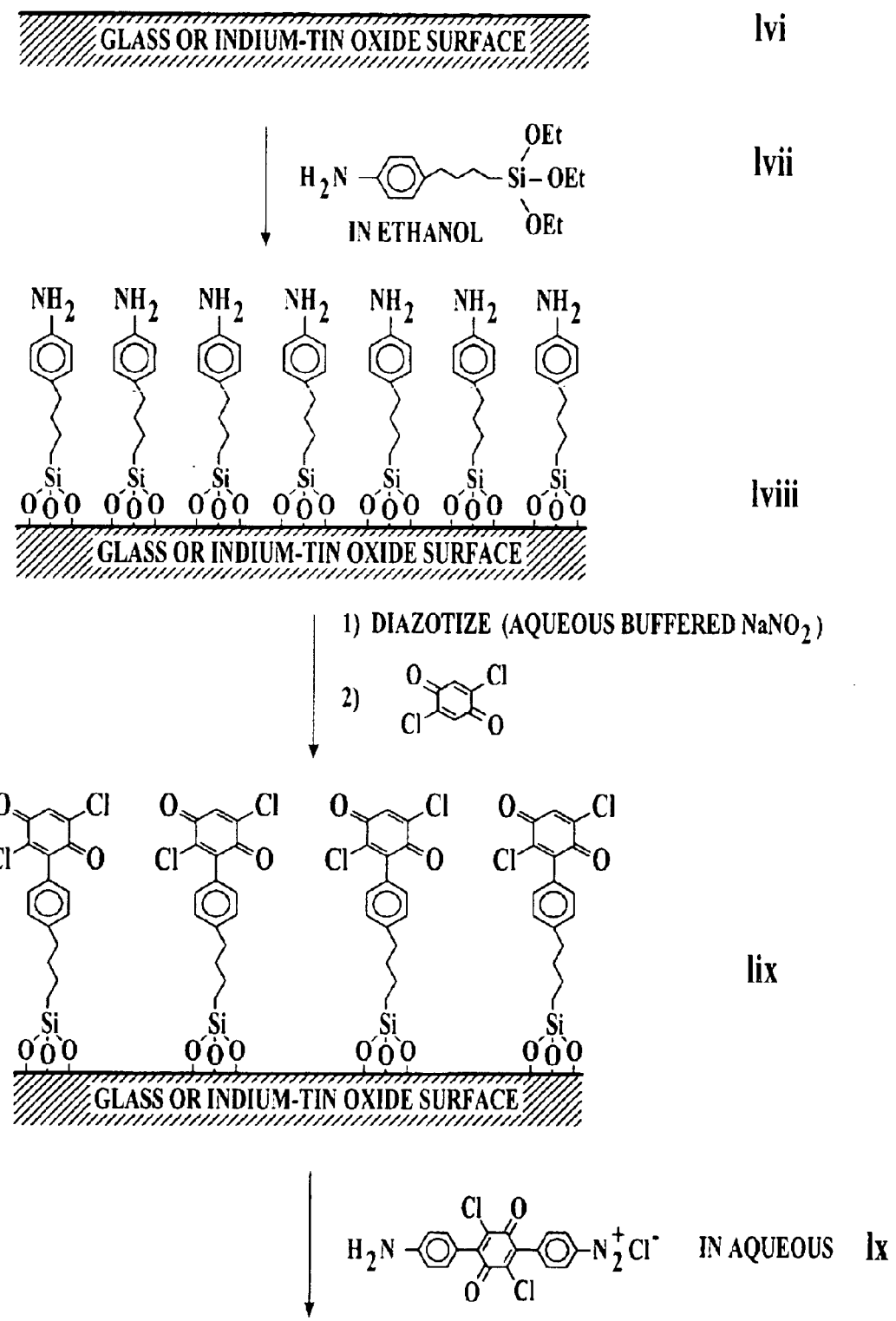
FIG. 9 illustrates a scheme for the preparation of para-phenylene compounds on a solid support.
Figure 9B:
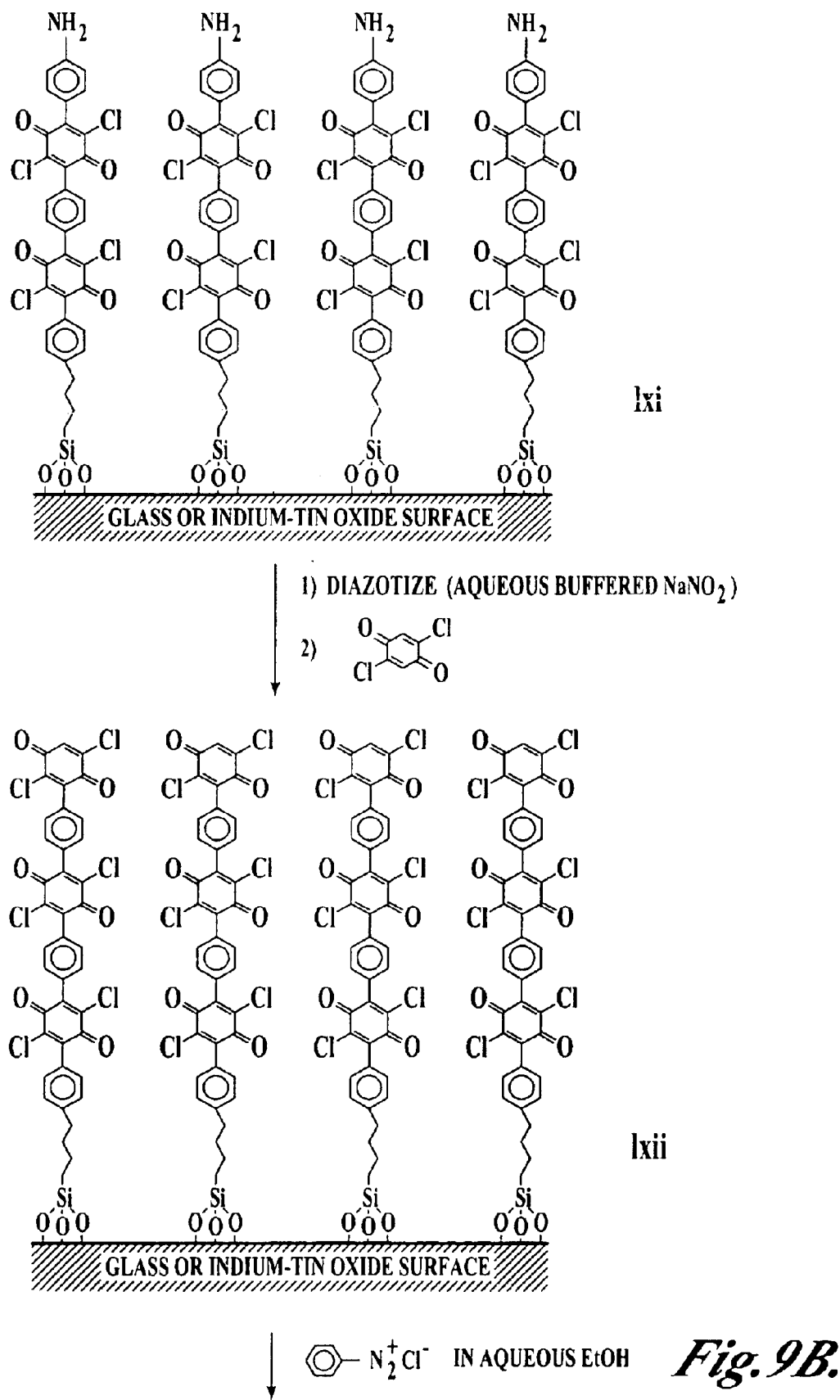
Figure 9C:
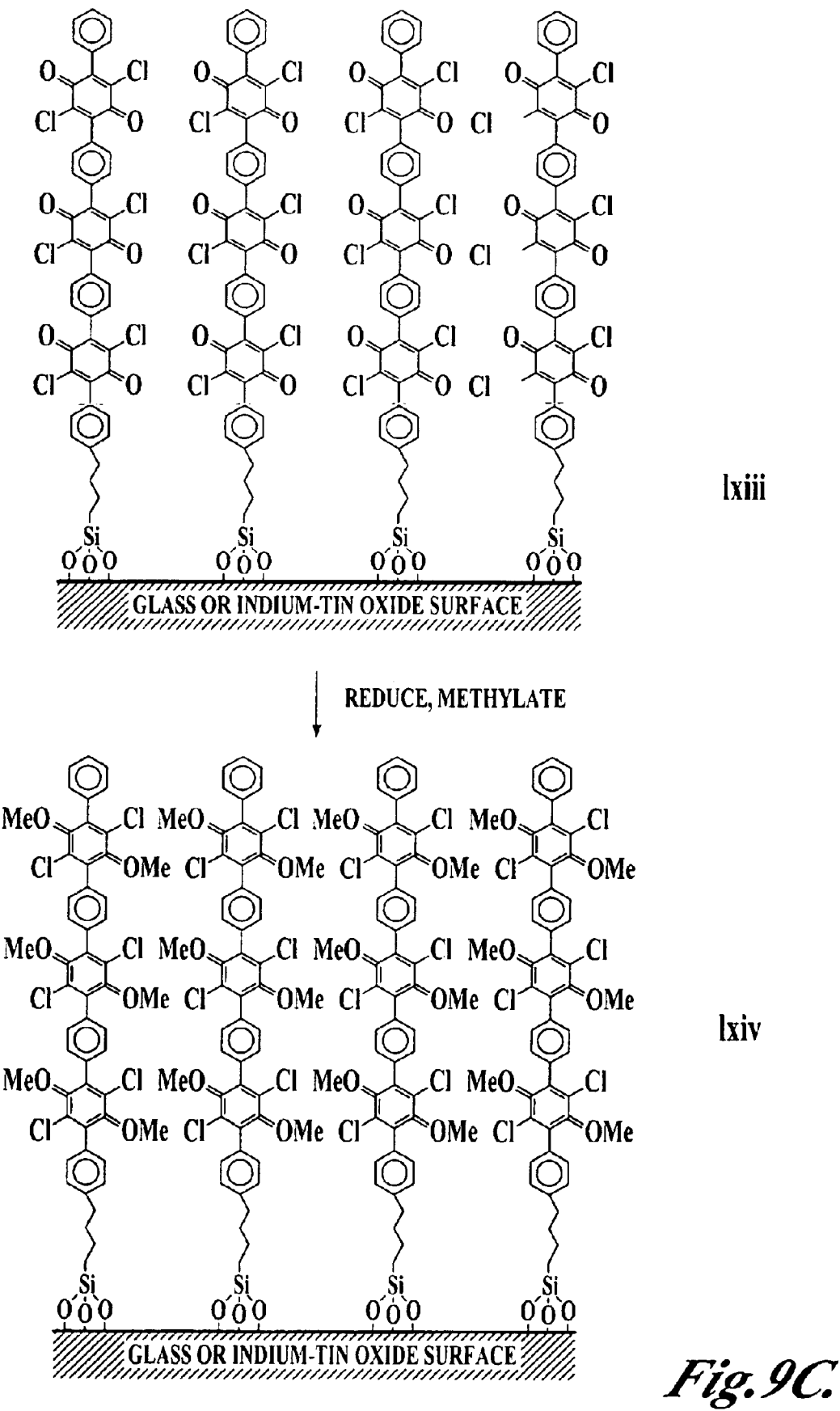

FIG. 9 provides a general scheme for the preparation of oligomeric or polymeric para-phenylene compounds on a solid support. In this figure, a solid support (e.g., glass or an indium-tin oxide surface, lvi) is treated with an arylalkyl silane (e.g., triethoxy 4-(4-aminophenyl)butylsilane, lvii, from United Chemical Technologies, Bristol, Pa.) to form a surface having a layer of attached aryl amine groups (lviii). Diazotization of the arylamines and reaction with 2,5-dichloro-1,4-benzoquinone provides a surface as shown in lix. Subesquent treatment of the derivatized surface lix with a diazonium species (e.g., lx) provides surface lxi. A second iteration of diazotization and subsequent reaction with 2,5-dichloro-1,4-benzoquinone provides surface lxii. Treatment of surface lxii with benzene diazonium chloride in aqueous ethanol provides surface lxiii which can be reduced and alkylated (e.g., with methyl iodide) to provide the surface lxiv. One of skill in the art will appreciate that the surface or support-bound chemistry can be modified to produce a variety of surfaces having bound oligomeric or polymeric para-phenylene compounds using the reactions outlined in FIGS. 1–8 above.

Accordingly, in still another aspect, the present invention provides a method of preparing a polymeric OLED material on a solid support, the method comprising:

(a) contacting a solid support-bound aryl diazonium salt with 3,6-dichloroquinone under conditions sufficient to form a solid support-bound aryl quinone derivative; and (b) contacting said solid support-bound aryl quinone derivative with a diazonium compound having the formula:

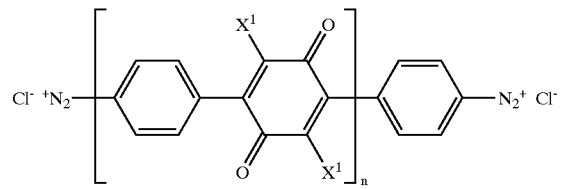

wherein each $X^1$ is a blocking group and the subscript n is an integer of from 0 to 4; under conditions sufficient to form an intermediate poly OLED material;

(c) repeating steps (a) and (b) from 2 to 70 times; and (d) terminating the polymeric OLED material by contacting the product of step (c) with a terminating diazonium compound having the formula:

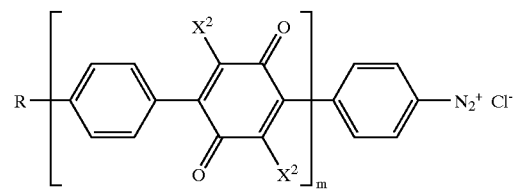

wherein each $X^2$ is a blocking group, R is a member selected from the group consisting of H, substituted or unsubstituted alkyl, substituted or unsubstituted alkoxy, substituted or unsubstituted alkylamino, substituted or unsubstituted alkylthio, substituted or unsubstituted dialkylamino, substituted or unsubstituted arylamino and substituted or unsubstituted diarylamino; and m is an integer of from 0 to 3.

In one group of embodiments, an intermediate poly OLED material is produced having the formula:

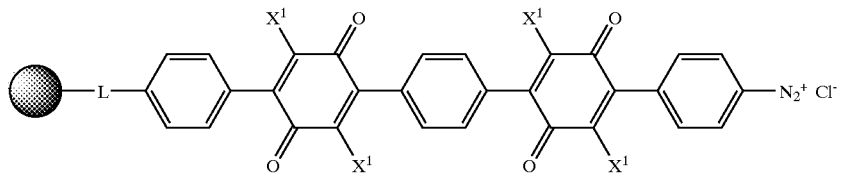

wherein L is a linking group; the shaded sphere is a solid support; and $X^1$ is a member selected from the group consisting of halogen, substituted or unsubstituted alkyl, substituted or unsubstituted alkoxy, substituted or unsubstituted alkylamino, substituted or unsubstituted alkylthio, and substituted or unsubstituted dialkylamino. Preferably, the solid support is selected from glass, tin oxide, indium oxide, and mixtures thereof.

In yet another aspect, the present invention provides a solid support-bound poly OLED material formed by the methods above.

The solid supports used in this aspect of the invention can be any of a variety of supports used and known in field of liquid-crystal display technology. Preferred supports include glass supports, tin oxide supports, indium oxide supports and tin oxide/indium oxide mixture supports.

Similarly, the solid support-bound aryl diazonium salt of step (a) can encompass a variety of aryl diazonium salts which are covalently attached to the solid support. Typically, the covalent attachment is through a linking group which provides suitable spacing for the aryl diazonium salt to interact freely with molecules or reactive components exposed to the diazonium salt. The linking group is typically 6–50 atoms long and, prior to attachment to the support, will have a surface attaching portion and a longer chain portion. The surface attaching portion is that part of the linking group or spacer which is directly attached to the solid support. This portion can be attached to the solid support via carbon-carbon bonds using, for example, supports having (poly) trifluorochloroethylene surfaces, or preferably, by siloxane bonds (using, for example, glass, silicon oxide, tin oxide or indium oxide as the solid support). Siloxane bonds with the surface of the support are formed in one embodiment via reactions of surface attaching portions bearing trichlorosilyl or trialkoxysilyl groups. At the distal end of the linking group is a site for attachment to the aryl diazonium salt component. For example, groups which are suitable for attachment to a longer chain portion would include amines, hydroxyl, thiol, and carboxyl. One of skill in the art will appreciate that cleavable linkages are preferred for those embodiments in which the poly OLED material is ultimately to be removed from the support. For those embodiments in which the poly OLED material is to remain attached to the support, a more robust linkage is preferred. For example, FIG. 9 illustrates the attachment of an aryl amine (a diazonium salt precursor) to a solid support via a linking group that is covalently attached to the aryl amine through a stable carbon-carbon bond.

The solid support bound aryl diazonium salt is contacted with a substituted benzoquinone (e.g., 2,5-dichloro-1,4-benzoquinone or another suitably blocked benzoquinone) under conditions sufficient to form a solid support-bound aryl quinone derivative. The aryl quinone derivative is the species that is the result of covalent bond formation between the carbon atom bearing the diazonium moiety and a carbon atom (at a position a to a carbonyl group) of the substituted benzoquinone. A variety of conditions can be employed for forming the desired support-bound aryl quinone derivative. For example, the substituted benzoquinone can be contacted with the solid support bound aryl diazonium salt in the presence of an aqueous/organic solvent mixture (e.g., ethanol/water) at temperatures of from about 0° C. to about room temperature, more preferably from about 0° C. to about 10° C. In this aspect of the invention, the substituted benzoquinone is preferably a 2,5-disubstituted 1,4-benzoquinone, more preferably, 2,5-dichloro-1,4-benzoquinone, 2,5-dimethyl-1,4-benzoquinone, 2,5-diphenyl-1,4-benzoquinone, 2,5-dimethoxy-1,4-benzoquinone, or 4,8-dichloro-1,5-naphthoquinone, as well as related benzoquinones having alternative alkoxy, halogen or alkyl blocking groups at the 2- and 5-positions.

The aryl quinone derivative produced in step (a) is one in which a benzoquinone moiety is attached at the distal end of the nascent poly OLED material (see, for example, lix in FIG. 9). Further elaboration of the poly OLED material is accomplished via reaction of a diazonium compound with the benzoquinone moiety to form a covalent linkage at the open carbon atom (see, for example, lxi in FIG. 9). Essentially any of the diazonium salts provided in the Figures above and further referred to herein can be used in this aspect of the invention. Preferably, the diazonium compound is one having the formula:

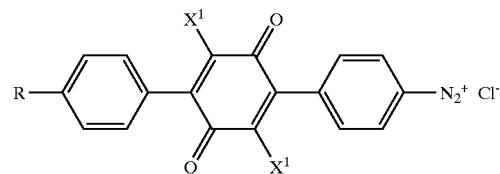

wherein the symbol R represents an amino, hydroxy, halogen, a substituted or unsubstituted alkyl, substituted or unsubstituted alkoxy, substituted or unsubstituted alkylamino, substituted or unsubstituted alkylthio, substituted or unsubstituted dialkylamino, substituted or unsubstituted arylamino or a substituted or unsubstituted diarylamino. Protected forms of the above groups are also useful in the present invention. The letter $X^1$ represents a blocking group such as, for example, a halogen, substituted or unsubstituted alkyl, substituted or unsubstituted alkoxy, substituted or unsubstituted dialkylamino, substituted or unsubstituted phenyl, and the like.

The conditions used to form the intermediate poly OLED material are essentially those conditions (solvent, temperature) described above for step (a). Preferably, the reaction is carried out in an aqueous ethanol mixture at a temperature of from 0° C. to about room temperature.

In one group of particularly preferred embodiments, the intermediate poly OLED material has the formula:

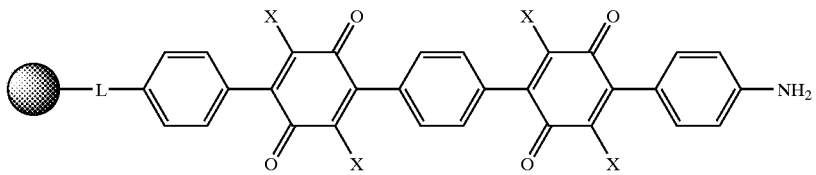

wherein L is a linking group; the shaded sphere is a solid support; and X is selected from halogen, substituted or unsubstituted alkyl, substituted or unsubstituted alkoxy, substituted or unsubstituted alkylamino, substituted or unsubstituted alkylthio, and substituted or unsubstituted dialkylamino.

Additional Uses of Condensed Poly Para-Phenylene Compounds

The arylation of quinones, described herein, can be used to prepare reactive monomers that also find utility in the preparation of crosslinked light-emitting polymers. For example, reactive monomers can be patterned like photoresists to allow patterning of red-green-blue (RGB) full-color light emitting pixels. An example of such a process is shown in FIGS. 10 (for poly para-phenylene compounds) and 11 (for polyfurano ladder compounds).

Figure 10A:
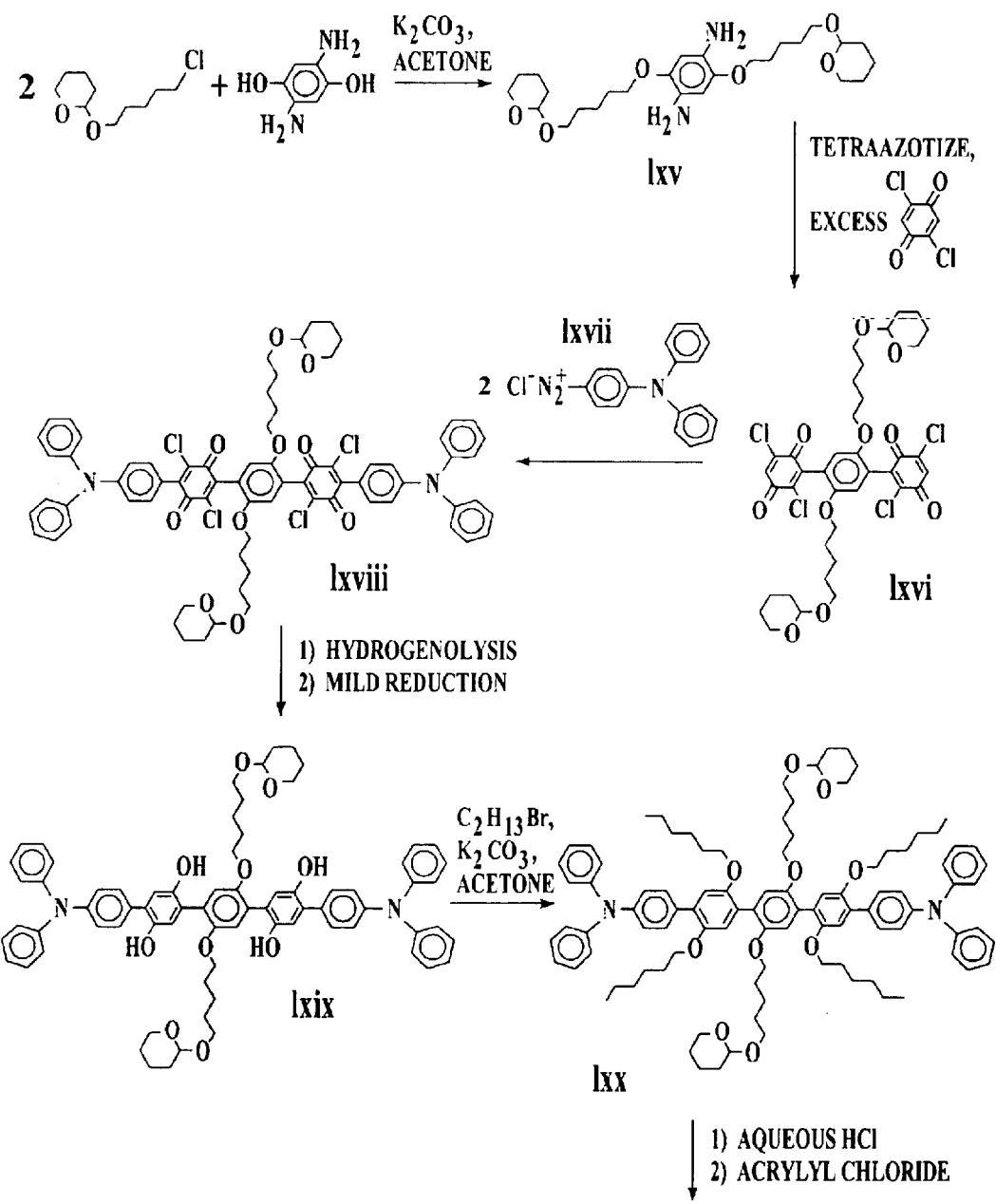
FIGS. 10 and 11 illustrate the preparation of polymerized light emitting polymers.
Figure 10B:
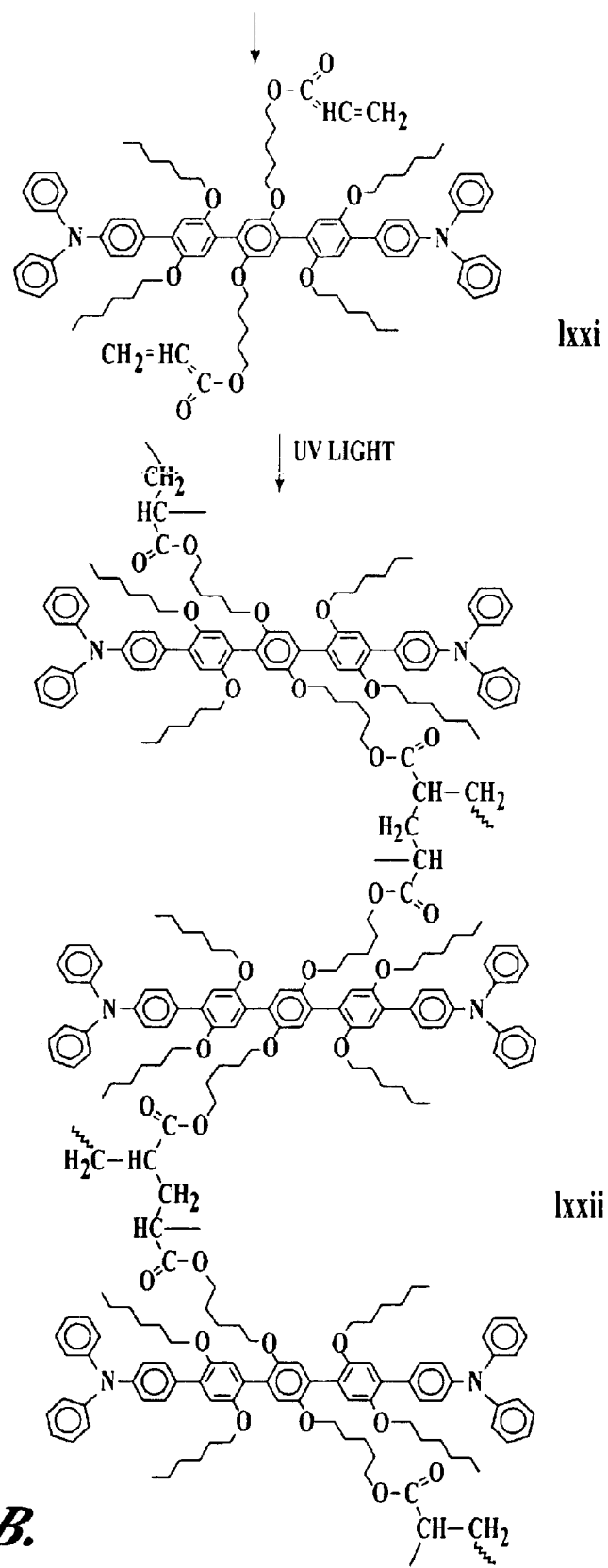

Turning first to FIG. 10, alkylation of the phenolic hydroxy groups of 2,5-dihydroxyphenylene-1,4-diamine with the THP-protected form of 5-chloro-1-pentanol provides lxv. Oxidation of the diamine to a bis-diazonium salt and treatment of the product with excess 2,5-dichloro-1,4-benzoquinone provides lxvi. Reaction at the remaining benzoquinone centers with diazonium salt lxvii provides lxviii. Hydrogenolysis and reduction under mild conditions provides lxix. Alkylation of the hydroquinone hydroxy groups produced in the preceding step results in lxx. Removal of the THP protecting groups and acylation of the resultant hydroxyl groups with, for example, acryloyl chloride provides the diacrylate derivative lxxi. Exposure of the acrylate to UV light provides a crosslinked product lxxii.

Figure 11A:
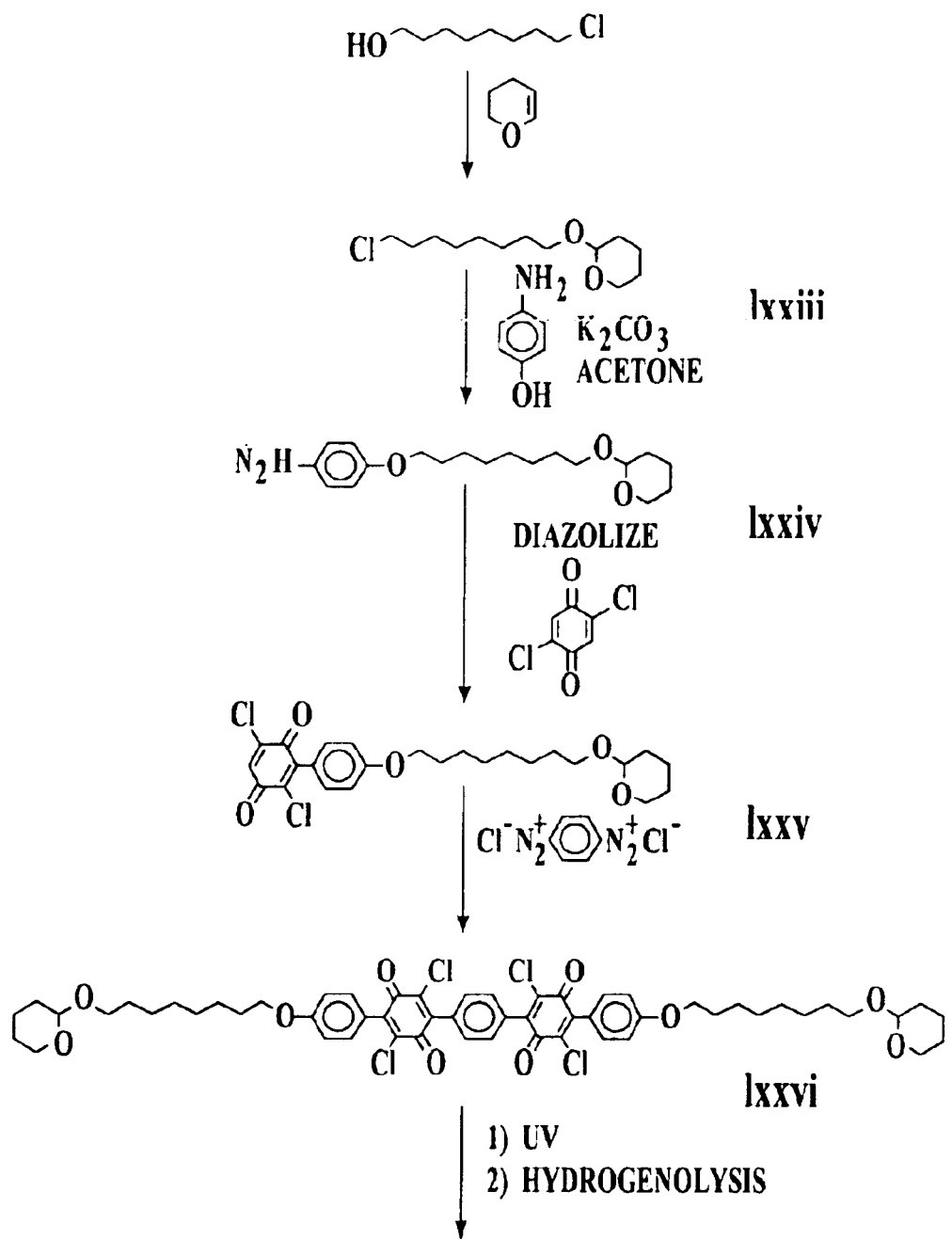
Figure 11B:
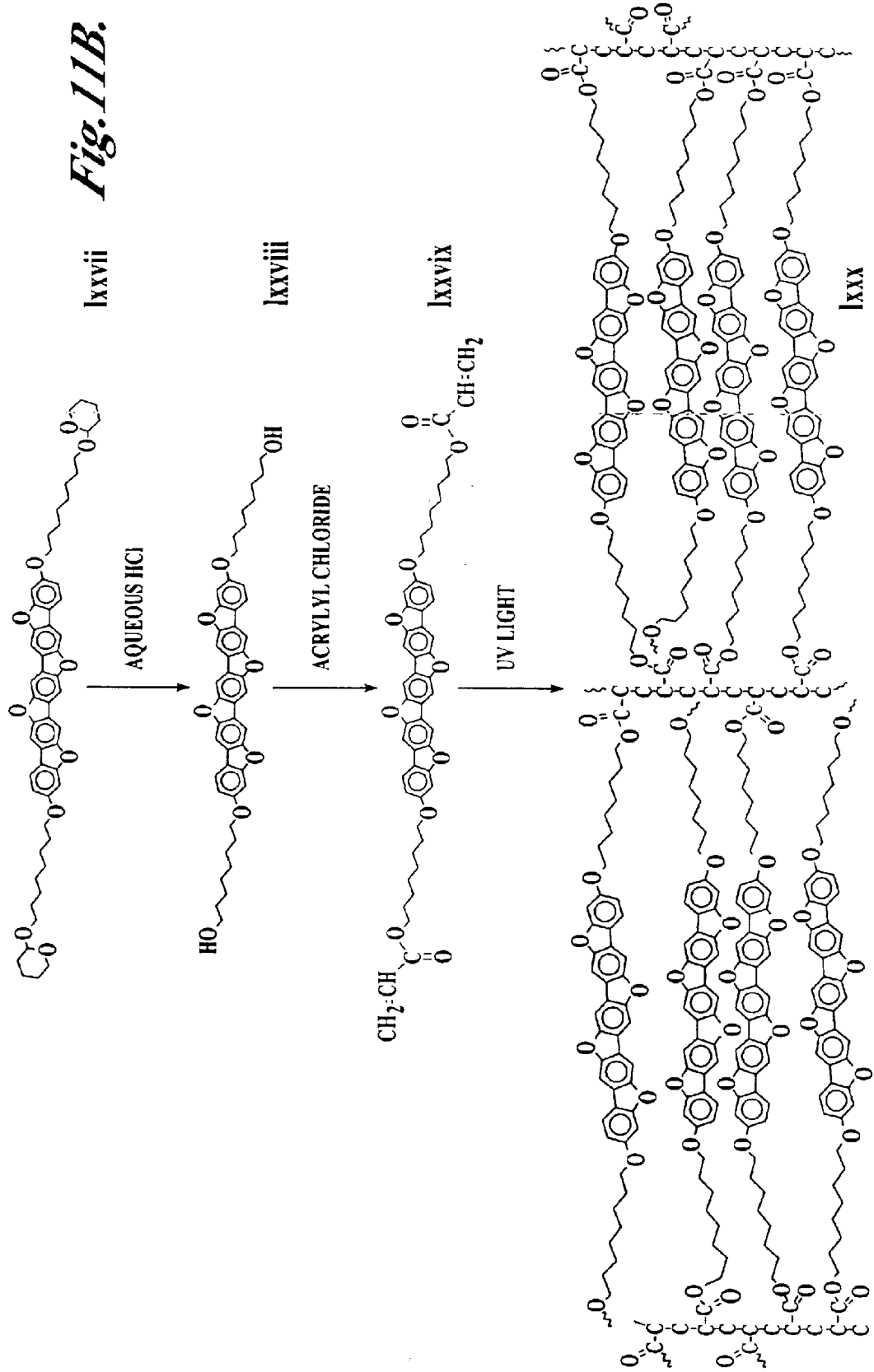

Using a similar series of reactions (protecting groups, diazotization and reduction chemistry), a crosslinked polyfurano ladder composition can be prepared (see FIG. 11). Protection of the hydroxy group of 8-chloro-1-octanol as its THP ether provides lxxiii, which can be used to alkylate 4-aminophenol (Aldrich Chemical Co.) to produce lxxiv. Oxidation of the amine to a diazonium salt and treatment of the product with 2,5-dichloro-1,4-benzoquinone provides lxxv. Reaction at the remaining benzoquinone center with a bis-diazonium salt provides the bis adduct lxxvi. Exposure of the non-condensed oligomer to UV light and hydrogenation of the product (to remove the chloro substituents) provides lxxvii. Removal of the THP groups (using aqueous HCl) and acylation of the hydroxyl groups with acryloyl chloride provides a doubly activated monomer lxxix. Exposure of lxxix to UV light provides the crosslinked composition lxxx.

All publications and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An oligomeric para-phenylene compound having the formula:

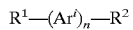

$$R^1—(Ar^i)_n—R^2$$

wherein the subscript n is 5;

each $Ar^i$ group is a substituted or unsubstituted aryl group, with at least one $Ar^i$ group being selected from phenylene having from 1 to 4 halogen substituents;

$R^1$ and $R^2$ are each substituents that increase the solubility of the para-phenylene compound in nonpolar organic solvents relative to the solubility of the corresponding compound and wherein $R^1$ and $R^2$ are each independently substituents having the formula:

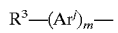

$$R^3—(Ar^j)_m—$$

wherein the subscript m is 1;

each $Ar^j$ is substituted or unsubstituted phenylene and $R^3$ is selected from the group consisting of H, substituted or unsubstituted ($C_1$–$C_{12}$) alkyl, substituted or unsubstituted ($C_1$–$C_{12}$) alkylamino, substituted or unsubstituted ($C_1$–$C_{12}$) alkylthio, substituted or unsubstituted di($C_1$–$C_{12}$) alkylamino, substituted or unsubstituted arylamino and substituted or unsubstituted diarylamino; and with the proviso that the $Ar^i$ groups are linked together in a 1,4-paraphenylene manner.

* * * * *